(12) United States Patent
Chen et al.

(10) Patent No.: US 8,797,642 B2
(45) Date of Patent: Aug. 5, 2014

(54) LARGE MODE AREA OPTICAL FIBER

(75) Inventors: Xin Chen, Corning, NY (US); Joohyun Koh, Painted Post, NY (US); Ming-Jun Li, Horseheads, NY (US); Anping Liu, Big Flats, NY (US)

(73) Assignee: Corning Incorporated, Corning, NY (US)

( * ) Notice: Subject to any disclaimer, the term of this patent is extended or adjusted under 35 U.S.C. 154(b) by 441 days.

(21) Appl. No.: 12/669,664

(22) PCT Filed: Jul. 16, 2008

(86) PCT No.: PCT/US2008/008689
§ 371 (c)(1),
(2), (4) Date: Jan. 19, 2010

(87) PCT Pub. No.: WO2009/014623
PCT Pub. Date: Jan. 29, 2009

(65) Prior Publication Data
US 2010/0195194 A1    Aug. 5, 2010

Related U.S. Application Data

(60) Provisional application No. 60/961,377, filed on Jul. 20, 2007.

(51) Int. Cl.
*G02B 6/036* (2006.01)
*H04B 10/17* (2006.01)
(52) U.S. Cl.
USPC .......................................... 359/341.1; 385/127
(58) Field of Classification Search
USPC .......................................... 359/341.1; 385/127
See application file for complete search history.

(56) References Cited

U.S. PATENT DOCUMENTS 6,137,813 A     10/2000  Ionov et al. ................... 372/6
6,614,975 B2 *   9/2003  Richardson et al. ......... 385/127

(Continued)

FOREIGN PATENT DOCUMENTS

WO          2006/021609        2/2006
WO     WO2006021609 A1         3/2006

OTHER PUBLICATIONS

International Search Report mailed Nov. 28, 2008 relating to International Application No. PCT/US2008/008689.

(Continued)

*Primary Examiner* — Eric Bolda
(74) *Attorney, Agent, or Firm* — Svetlana Short

(57) ABSTRACT

A large-mode-area (LMA) optical fiber (10) that operates as a single-mode optical fiber. The optical fiber includes a core region (20) surrounded by an inner cladding (32), which in turn is surrounded by an outer cladding (40). The inner cladding includes at least one up-doped ring region (32R1). The ring region is configured to form a large attenuation differential between the higher-order modes and the fundamental mode so only that the fundamental mode remains traveling in the optical fiber. If necessary, the optical fiber can include a bend (10B) having a select "resonant" bend diameter (DB) that increases the relative attenuation of the fundamental and higher-order modes. The optical fiber supports an effective mode field diameter (MFD) of up to 40 μm to 50 μm. As a result, detrimental non-linear effects are suppressed, which allows the optical fiber to carry substantially more optical power than conventional LMA optical fibers. The LMA optical fiber is thus eminently suited for a number of optical-fiber-based applications calling for high optical power, such as fiber lasers and pump sources for wavelength conversion.

48 Claims, 13 Drawing Sheets

(56) References Cited

U.S. PATENT DOCUMENTS

| | | | |
|---|---|---|---|
| 2001/0036348 A1* | 11/2001 | Rousseau et al. | 385/123 |
| 2002/0172486 A1 | 11/2002 | Fermann | 385/128 |
| 2004/0247272 A1 | 12/2004 | Dawson et al. | |
| 2005/0169326 A1 | 8/2005 | Jacob et al. | 372/22 |
| 2006/0021609 A1 | 2/2006 | Jensen | 124/56 |
| 2006/0088261 A1 | 4/2006 | Berkey et al. | |
| 2006/0103919 A1* | 5/2006 | DiGiovanni et al. | 359/341.5 |
| 2006/0269200 A1* | 11/2006 | DiGiovanni et al. | 385/123 |
| 2007/0248136 A1* | 10/2007 | Leonardo et al. | 372/55 |
| 2008/0025363 A1* | 1/2008 | Yla-jarkko et al. | 372/98 |
| 2009/0262416 A1* | 10/2009 | Lancaster et al. | 359/341.1 |

OTHER PUBLICATIONS

International Preliminary Report on Patentability, relating to International Application No. PCT/US2008/008689, mailed Jan. 26, 2010.

Limpert et al Article; "500 W continuous-wave fibre laser with excellent beam quality"; Electronics Letters, Apr. 17, 2003; vol. 39; No. 8; p. 645-647.

Zenteno Article; "High-Power Double-Clad Fiber Lasers"; Journal of Lightwave Technology, vol. 11, No. 9; Sep. 1993; p. 1435-1446.

Koplow et al Article; "Single-mode operation of a coiled multimode fiber amplifier"; 2000 Optical Society of America; vol. 25; No. 7; Apr. 1, 2000; p. 442-444.

Liem et al Article; "100-W single-frequency master-oscillator fiber power amplifier"; 2003 Optical Society of America; Sep. 1, 2003; vol. 28, No. 17; Optics Letters; p. 1537-1539.

Jeong et al Article; "Single-frequency, polarized ytterbium-doped fiber MOPA source with 264 W output power"; 2004 Optical Society of America.

Heiblum, et al Article; "Analysis of Curved Optical Waveguides by Conformal Transformation"; IEEE Journal of Quantum Electronics; vol. QE-11, No. 2, Feb. 1975; p. 75-83.

Fini Article; "Design of solid and microstructure fibers for suppression of higher-order modes"; Optics Express; May 3, 2005/vol. 13, No. 9; p. 3477-3490.

Fini Article; "Bend-resistant design of conventional and microstructure fibers with very large mode area"; Optics Express; Jan. 9, 2006; Vo. 14, No. 1; p. 69-81.

Wang et al Article; "Theoretical and experimental investigations of macro-bend Losses for standard single mode fibers"; Optics Express; Jun. 13, 2005; vol. 13, No. 12; p. 4476-4484.

Heiblum, M. and Harris, J.H., "Correction to "Analysis of curved optical waveguides by conformal transformation"", IEEE J. Quantum Electronics, vol. 12, Issue 5, p. 313 (1976).

Jianming Jin, "The finite element method in electromagnetics", Wiley Interscience, (2002), pp. 375-395.

Shkurikhin, N. S. et al., "300W single-frequency, single-mode, all-fiber format ytterbium amplifier operating at 1060-1070-nm wavelength range," Abstract 6102-61, Photonics West, San Jose, Jan. 21-26, 2006.

* cited by examiner

LARGE MODE AREA OPTICAL FIBER

CROSS-REFERENCE TO RELATED APPLICATIONS

This application claims the benefit of priority under 35 U.S.C. §119 of U.S. Provisional Application Ser. No. 60/961,377 filed on Jul. 20, 2007 the content of which is relied upon and incorporated herein by reference in its entirety.

Parts of this invention were made with Government support under Agreement No. MDA972-02-3-004 awarded by DARPA. The Government may have certain rights in some of the claims of the invention.

BACKGROUND OF THE INVENTION

1. Field of the Invention

The present invention relates generally to optical fibers, and in particular to an optical fiber having a large mode area and that operate as a single-mode optical fiber due to the attenuation of higher-order modes.

2. Technical Background

Optical fibers are the key component in fiber lasers. High-power, single-frequency fiber lasers have many different applications, including laser radar and imaging, frequency conversion for generating visible or ultra-violet (UV) light, as modules for spectral and coherent beam combining, as biomedical light sources, and in microfabrication.

It is generally desirable for a fiber laser to have as high an output power and as high a brightness as possible. However, as the output power increases, detrimental non-linear effects, such as stimulated Brillouin scattering (SBS) and stimulated Raman scattering (SRS), increase. One way to increase a fiber laser's output power is to provide the optical fiber with a large mode area by decreasing the core relative refractive index and increasing the core diameter. However, the maximum output power of present day continuous-wave (CW) single-frequency fiber lasers or optical fiber amplifiers is limited to about several hundred watts due to stimulated Brillouin scattering (SBS), even when a large-mode-area (LMA) optical fiber with a core diameter of 20~30 μm and a core numerical aperture (NA) of 0.05~0.06 is used. Increasing the core diameter requires reducing the core NA to preserve diffraction-limited beam quality.

Although an ultra-low NA fiber with a NA of <0.03 can be formed using photonic crystal technology, such an optical fiber is very sensitive to fiber structural parameters, thus very difficult to manufacture.

Another option for overcoming nonlinear effects is to use a multimode optical fiber. To preserve diffraction-limited beam quality, the multimode optical fiber is coiled very tightly to provide tight bends that cause the high-order modes have much higher losses than the fundamental mode. Tight bending is typically defined as bend diameter of 50-150 times the outside diameter of a fiber. For highly multimode optical fibers (V number>4), however, the bending-induced loss difference between the fundamental and the high-order modes is so small that achieving diffraction-limited beam quality is virtually impossible.

For high-power fiber lasers, coiling the optical fiber to create a very small bend diameter is problematic. This is because most high-power fiber lasers require a large optical fiber diameter in order to couple sufficient pump light into the optical fiber. Tight bends in such optical fiber cause high pump-light loss and can lead to mechanical failure of the optical fiber. Furthermore, tight bending causes significant mode distortion and reduces the effective mode area.

SUMMARY OF THE INVENTION

The present invention is directed to a large-mode-area (LMA) optical fiber capable of suppressing nonlinear effects while carrying high optical power in a single mode, thus making it particularly suitable for use in connection with high-power fiber lasers and amplifiers. The optical fiber supports single-mode operation at a given wavelength due to the attenuation of higher-order modes, which ensures substantially diffraction limited beam quality. The high attenuation of higher order modes is caused by adding at least one "ring" having a raised refractive index in the inner cladding region. The LMA optical fiber does not require tight bending to become single mode. In some embodiments, the bend diameter is greater than 90 mm. In certain embodiments, the LMA optical fiber requires no bending. The optical fiber effective mode field diameter is scalable up to 40~50 um, which is about twice of that of existing optical fibers. As a result, a fiber laser system that uses the LMA optical fiber of the present invention can support up to about 10 times more power than a conventional LMA fiber without the onset of above-mentioned detrimental nonlinear effects.

Accordingly, an aspect of the invention is a LMA optical fiber that includes a core region having a relative refractive index $\Delta_C$, wherein $0.02\% < \Delta_C < 0.15\%$ and core radius $r_1$ wherein $10\ \mu m < r_1 < 30\ \mu m$. The optical fiber also includes an inner cladding region having an outer radius $r_{IN}$, wherein $50\ \mu m < r_{IN} < 500\ \mu m$. The inner cladding region includes a first annular region immediately adjacent to and surrounding the core region and having an inner radius $r_1$, an outer radius $r_2 = r_1 + \delta r_I$, where $3\ \mu m < \delta r_I < 15\ \mu m$, and a relative refractive index $\Delta_1 = 0\%$. At least a first ring surrounds the first annular region and has a relative refractive index $\Delta_{R1}$, wherein $0.5\Delta_C < \Delta_{R1} < 2\Delta_C$, and $\Delta_{R1} > \Delta_1$, an inner radius $r_2$, an outer radius $r_3$, and a ring width $W_{R1}$, wherein $r_{IN} = r_3 + \delta r_{O1}$ for $\delta r_{O1} \geq 0$, and wherein $r_{IN} \geq r_3 > r_2 > r_1$. The optical fiber also includes an annular outer section immediately surrounding the ring section. The annular outer section has an inner radius $r_3$, an outer radius $r_{IN} = r_3 + \delta r_O$, and a relative refractive index $\Delta_3$, wherein $\Delta_3 \geq \Delta_1$. The optical fiber also includes an outer cladding immediately surrounding the inner cladding and having a relative refractive index $\Delta_O \leq \Delta_1$.

Another aspect of the invention is a method of forming a LMA optical fiber. The method includes forming a core region having a relative refractive index $\Delta_C$ wherein $0.02\% < \Delta_C < 0.15\%$ and core radius $r_1$ wherein $10\ \mu m < r_1 < 30\ \mu m$. The method also includes forming a cladding around the core region, the cladding having inner and outer cladding regions, wherein the inner cladding region has an outer radius $r_{IN}$ wherein $50\ \mu m < r_{IN} < 500\ \mu m$. The method further includes forming in the inner cladding region a first annular region immediately adjacent to and surrounding the core region and having an inner radius $r_1$, an outer radius $r_2 = r_1 + \delta r_I$, where $3\ \mu m < \delta r_I < 15\ \mu m$, and relative refractive index $\Delta_1 = 0$. The method also includes forming in the inner cladding region immediately surrounding the first annular region at least a first ring having a relative refractive index $\Delta_{R1}$ wherein $0.5\Delta_C < \Delta_{R1} < 2\Delta_C$, and $\Delta_{R1} > \Delta_1$, an inner radius $r_2$, an outer radius $r_3$, and a ring width $W_{R1}$, wherein $r_{IN} = r_3 + \delta r_{O1}$ for $\delta r_{O1} \geq 0$, and wherein $r_{IN} \geq r_3 > r_2 > r_1$.

The LMA optical fibers disclosed herein have a number of advantages over prior art optical fibers. The effective core diameter can be about twice as large as existing optical fibers, which provides greater suppression of detrimental nonlinear-effects while also allowing for relatively short lengths of fibers to be used. Further, the bending-loss attenuation differential $\Delta\alpha$ (or alternatively, the relative attenuation $\alpha_r$) between the fundamental and higher-order modes is sufficiently large at a select bending radius that only the fundamental mode can propagate. When used in an optical fiber amplifier or optical fiber, the fundamental mode can then be amplified, resulting in high output beam quality.

The at least one ring makes the design of the LMA optical fiber of the present invention much more flexible for meeting a variety of performance requirements. For example, the LMA optical fiber of the present invention does not require tight bending, which is beneficial because tight bending leads to the loss of pump light when the optical fiber is used in fiber laser or amplifier applications. In certain embodiments, the LMA optical fiber of the present invention requires no bending.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description present embodiments of the invention, and are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention, and together with the description, serve to explain the principles and operations of the invention.

DETAILED DESCRIPTION OF THE PREFERRED EMBODIMENTS

Figure 1:
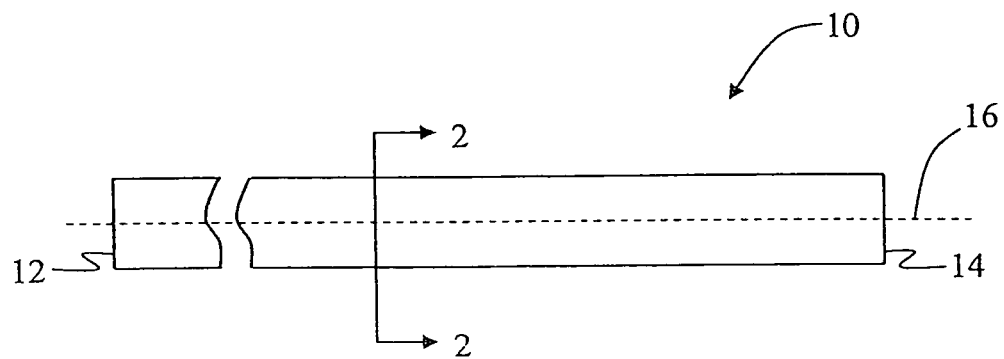
FIG. 1 is a schematic side view of a section of the LMA optical fiber according to the present invention.

Reference will now be made in detail to the present preferred embodiments of the invention, examples of which are illustrated in the accompanying drawings. Whenever possible, the same reference numbers and symbols are used throughout the drawings to refer to the same or like parts.

In the discussion below, the "refractive index profile" is the relationship between refractive index or relative refractive index and waveguide fiber radius. The "relative refractive index percent" for the $i^{th}$ region is defined herein as $\Delta_i(\%) = [(n_i^2 - n_1^2)/2n_i^2] \times 100$, where $n_i$ is the maximum refractive index in region i, unless otherwise specified, and $n_1$ is the refractive index of the first annular inner section 32I of the inner cladding 32, as discussed below. As used herein, the relative refractive index percent is simply referred to as "the relative refractive index" or "delta" ("$\Delta$") and its values are given in units of "%", unless otherwise specified or as is apparent by the context of the discussion.

In cases where the refractive index of a region is less than the average refractive index of the adjacent regions, the relative refractive index is negative and is referred to as a "depressed region" or as having a "depressed index," and is calculated at the point at which the relative refractive index is most negative unless otherwise specified. In cases where the refractive index of a region is greater than the average refractive index of the adjacent regions, the relative refractive index is positive and the region can be said to be "raised" or to have a "positive index."

An "updopant" is herein considered to be a dopant which has a propensity to raise the refractive index relative to pure undoped $SiO_2$. A "downdopant" is herein considered to be a dopant which has a propensity to lower the refractive index relative to pure undoped $SiO_2$. An updopant may be present in a region of an optical fiber having a negative relative refractive index when accompanied by one or more other dopants which are not updopants. Likewise, one or more other dopants which are not updopants may be present in a region of an optical fiber having a positive relative refractive index. A downdopant may be present in a region of an optical fiber having a positive relative refractive index when accompanied by one or more other dopants which are not downdopants. Likewise, one or more other dopants which are not downdopants may be present in a region of an optical fiber having a negative relative refractive index.

The "effective area" is defined as:

$$A_{eff} = 2\pi (\int f^2 r dr)^2 / (\int f^4 r dr),$$

where the integration limits are 0 to ∞, and f is the transverse component of the electric field associated with light propagated in the waveguide. As used herein, "effective area" or "$A_{eff}$" refers to optical effective area at a wavelength of 1550 nm unless otherwise noted.

The mode field diameter (MFD) is measured using the Peterman II method wherein, $2w=MFD$, and $w^2=(2\int f^2 r dr/[df/dr]^2 r dr)$, the integral limits being 0 to ∞. The core numerical aperture NA is defined as $[n^2_C-n^2_1]^{1/2}$, where $n_C$ is the refractive index of the core and $n_1$ is the refractive index of the inner annular section 32I of the inner cladding 30.

The bend resistance of an optical fiber can be gauged by induced attenuation under prescribed test conditions, for example by wrapping one or more turns around a cylindrical mandrel having a constant diameter. Likewise, a select amount of bending can be imparted to an optical fiber by using a mandrel having a select diameter, such as the bend diameter $D_B$, as discussed below, which leads to single-mode operation of the LMA optical fiber of the present invention.

The attenuation associated with the fundamental guided mode is given by $\alpha_F$, and the attenuation of one or more of the higher-order guided modes is given by $\alpha_H$. The "attenuation differential" between the higher-order mode(s) and the fundamental mode is given by $\Delta\alpha=\alpha_H-\alpha_F$ while the "relative attenuation" is given by $\alpha_r=\alpha_H/\alpha_F$. Both the "attenuation differential" and the "relative attenuation" are used below to describe the difference between the fundament mode and higher-order mode attenuation.

The optical fiber of the present invention has a structure that increases the attenuation of higher order modes. The optical fiber has a large core that supports multiple modes and at least one layer (ring) with a raised refractive index. The layer(s) with raised refractive index induces attenuation of higher order modes while the attenuation of the fundamental mode remains low. As a result, the optical fiber does not require tight bending to become single mode. In some example embodiments, $D_B>90$ mm. In certain embodiments, the optical fiber of the present invention requires no bending. Single mode operation is achieved in the optical fiber by having a sufficient differential attenuation (or relative attenuation) between the higher-order modes and the fundamental mode. The total attenuation of a higher order mode $\alpha_H$ is the sum of the attenuation due to optical fiber structural design and the attenuation due to bending. Thus, the term "single mode" and references to a "single-mode" of operation of the optical fiber refers to substantial attenuation of all higher order modes relative to the fundamental mode, whose attenuation is given by $\alpha_F$.

In an example embodiment, a suitable attenuation coefficient $\alpha_F$ for the fundamental mode is less than 1 dB/m, more preferably less than 0.5 dB/m, and even more preferably less than 0.1 dB/m. In an example embodiment, the relative attenuation (coefficient) $\alpha_r=\alpha_H/\alpha_F$ of the higher-order modes to the fundamental mode is 5, and more preferably is 10, and still more preferably is 20 or greater, and even more preferably is 50 or greater.

Figure 14:
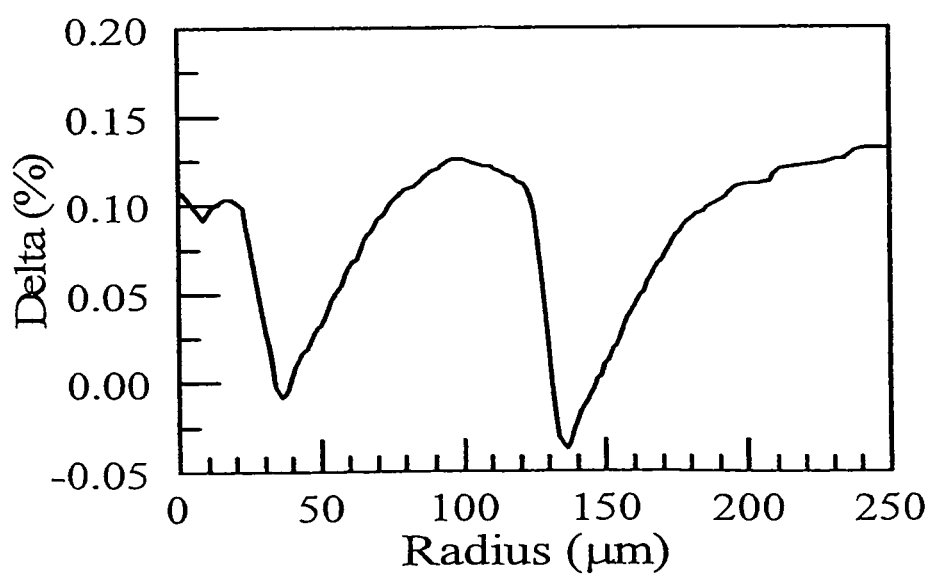
FIG. 14 is a plot of the measured relative refractive index $\Delta$ (%) as a function of radius r ($\mu$m) for an example LMA optical fiber having a core diameter $d_C$=30 $\mu$m.

In the discussion below and in the plots of the relative refractive index, the relative refractive index profiles are shown as idealized profiles for the sake of illustration. Those skilled in the art will understand that such idealized profiles do not actually occur in manufacturing (see, e.g., FIG. 14) and thus represent an approximation to the actual refractive index profile. However, the idealized profiles discussed below and represented in the Figures establish the basic principles of the invention and enable those skilled in the art to carry out the present invention.

General LMA Optical Fiber Structure

Figure 2:
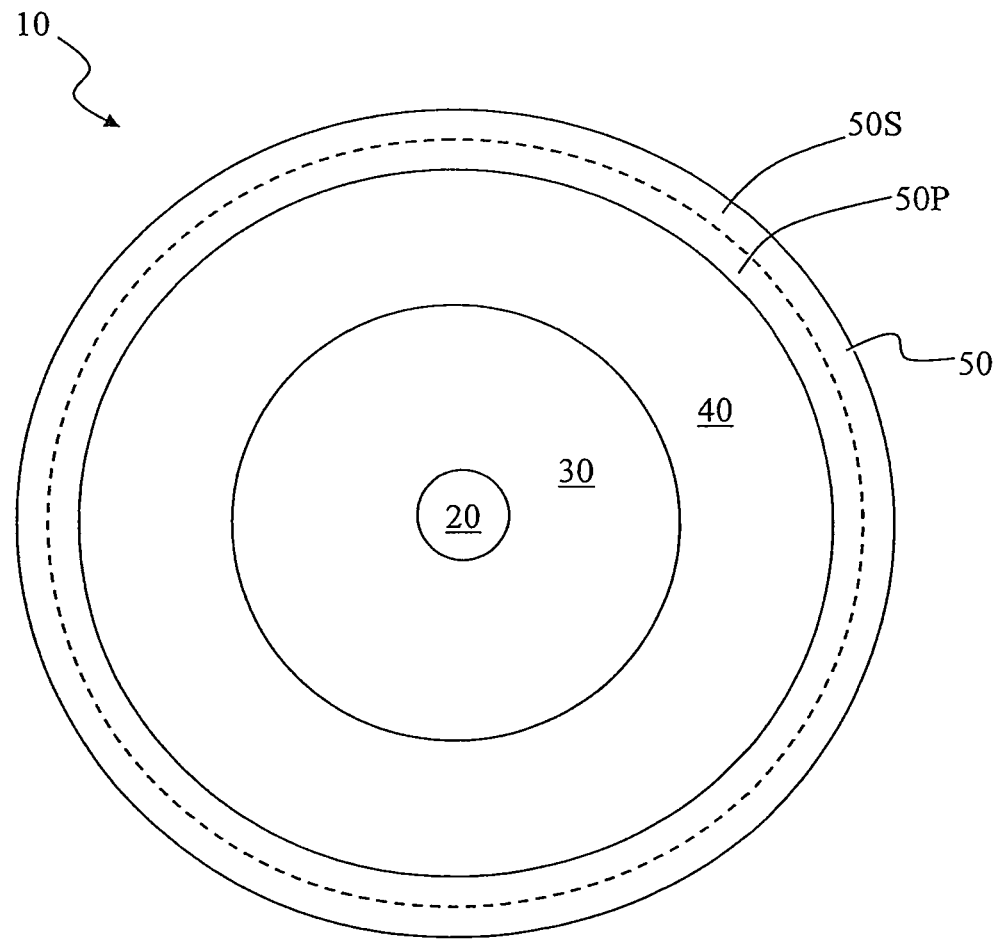
FIG. 2 is a cross-sectional view of a generalized example embodiment of the LMA optical fiber of FIG. 1 as taken along the line 2-2 in FIG. 1, that shows the core, inner cladding, outer cladding and cover.

FIG. 1 is a schematic side view of the large-area-mode (LMA) optical fiber 10 according to the present invention. FIG. 2 is a cross-sectional view of an example embodiment of LMA optical fiber 10 as taken along the line 2-2 in FIG. 1 and illustrates the main regions of LMA optical fiber 10. LMA optical fiber 10 has an input end 12, an output end 14, a centerline 16, and a number of different regions concentrically arranged about the centerline—namely, a central core region ("core") 20, an inner annular cladding region ("inner cladding") 30 immediately surrounding the core, and an outer annular cladding region ("outer cladding") 40 immediately surrounding the inner cladding. Core 20 has a refractive index $n_C$ and an outer radius $r_1$. The core diameter $d_C=2r_1$.

In an example embodiment, outer cladding 40 is immediately surrounded by a coating 50 that includes a primary coating 50P and a secondary coating 50S that immediately surrounds the primary coating (FIG. 2).

In an example embodiment, core region 20 of LMA optical fiber 10 has an effective area of $A_{eff}>150$ μm$^2$, more preferably has $A_{eff}>300$ μm$^2$ and even more preferably has $A_{eff}>500$ μm$^2$.

As discussed in greater detail below, inner cladding 30 includes at least one ring region ("ring") 32R designed to provide a relatively large bend diameter that causes LMA optical fiber 10 to support a single-mode.

Single-Ring LMA Optical Fiber Embodiment

Figure 3:
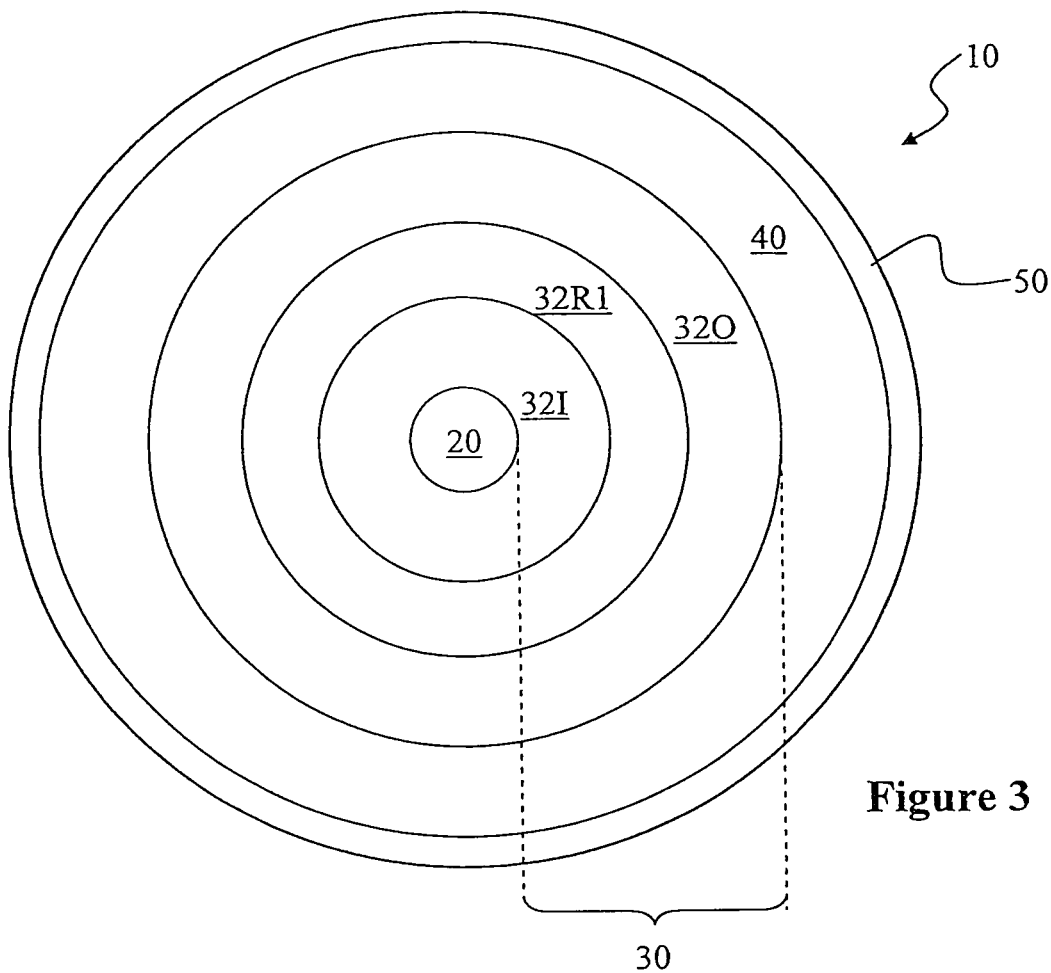
FIG. 3 is a more detailed cross-sectional view of the generalized example embodiment of the LMA optical fiber of FIG. 2, illustrating an example embodiment wherein the inner cladding includes a single ring.
Figure 4:
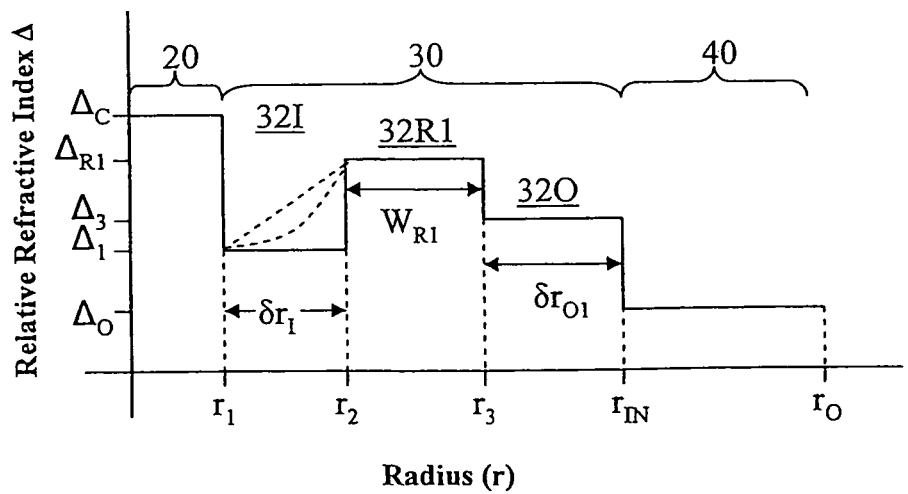
FIG. 4 is a plot of an idealized relative refractive index profile $\Delta$ as a function of optical fiber radius r for the example embodiment shown in the cross-sectional view of FIG. 3.

FIG. 3 is a cross-sectional diagram similar to FIG. 2, illustrating an example embodiment of optical fiber 10 wherein inner cladding 30 includes a single ring 32R1. FIG. 4 is a plot of the relative refractive index Δ versus radius r for the example embodiment of FIG. 3. Inner cladding 30 has radius $r_1$ as its inner radius and has an outer radius $r_{IN}$. Inner cladding 30 includes an annular inner section 32I immediately surrounding core 20 and having an inner radius $r_1$, an outer radius $r_2=r_1+\delta r_I$ and a refractive index $n_1$, which by the definition of the relative refractive index as set forth above leads to $\Delta_1=0$.

Outer cladding 40 has an inner radius $r_{IN}$, an outer radius $r_O$, and an index of refraction $n_O$ and an associated relative refractive index $\Delta_O$. In example embodiments, the outer cladding relative refractive index $\Delta_O<\Delta_1$, is preferably $\Delta_O<\Delta_1-0.01\%$, is more preferably $\Delta_O<\Delta_1-0.015\%$, and is even more preferably $\Delta_O<\Delta_1-0.02\%$.

Inner annular section 32I of the present embodiment, as well as in the example embodiments discussed below, need not have a constant relative refractive index $\Delta_1$ but can have a changing relative refractive index, as indicated by the dashed lines in FIG. 4. In the case where relative refractive index $\Delta_1$ varies, the lowest value of $\Delta_1$ for inner annular section 32I is selected for calculating relative refractive indices.

Ring 32R1 is formed in inner cladding 30 immediately surrounding annular inner section 32I. Ring 32R1 has an index of refraction $n_{R1}$, an associated relative refractive index $\Delta_{R1}$, an inner radius $r_2$ and an outer radius $r_3=r_2+W_{R1}$, where $W_{R1}$ is the width of the ring. Inner cladding 30 further includes in an example embodiment an annular outer section 32O immediately surrounding ring section 32R1 and having an inner radius $r_3$, an outer radius $n_{IN}=r_3+\delta r_O$, an index of refraction $n_3$, and an associated relative refractive index $\Delta_3$.

In an example embodiment, $0.02\% < \Delta_C < 0.15\%$, in another example embodiment $0.02\% < \Delta_C < 0.1\%$, and further in an example embodiment $0.08\% < \Delta_C < 0.09\%$. Also in an example embodiment, $10~\mu m < r_1 < 30~\mu m$. In another example embodiment, $50~\mu m < r_2 < 500~\mu m$. In an additional example embodiment, $3~\mu m < \delta r_I < 15~\mu m$. In another example embodiment, $0.5\Delta_C < \Delta_{R1} < 2\Delta_C$. Also in an example embodiment, $\Delta_{R1} > \Delta_1$. In another example embodiment, $\delta r_O$ is at least 2 μm, and is preferably about 5 μm. Further in an example embodiment, $\Delta_1 \leq \Delta_3$. Also in an example embodiment, $\Delta_C = \Delta_{R1}$, while in a related example embodiment, $\Delta_C > \Delta_{R1}$. In an example embodiment, optical fiber 10 includes one or more of the above-described properties to the extent they are not mutually exclusive or operationally inconsistent with the intended scope of the invention as described herein and as will be understood by one skilled in the art.

Figure 5:
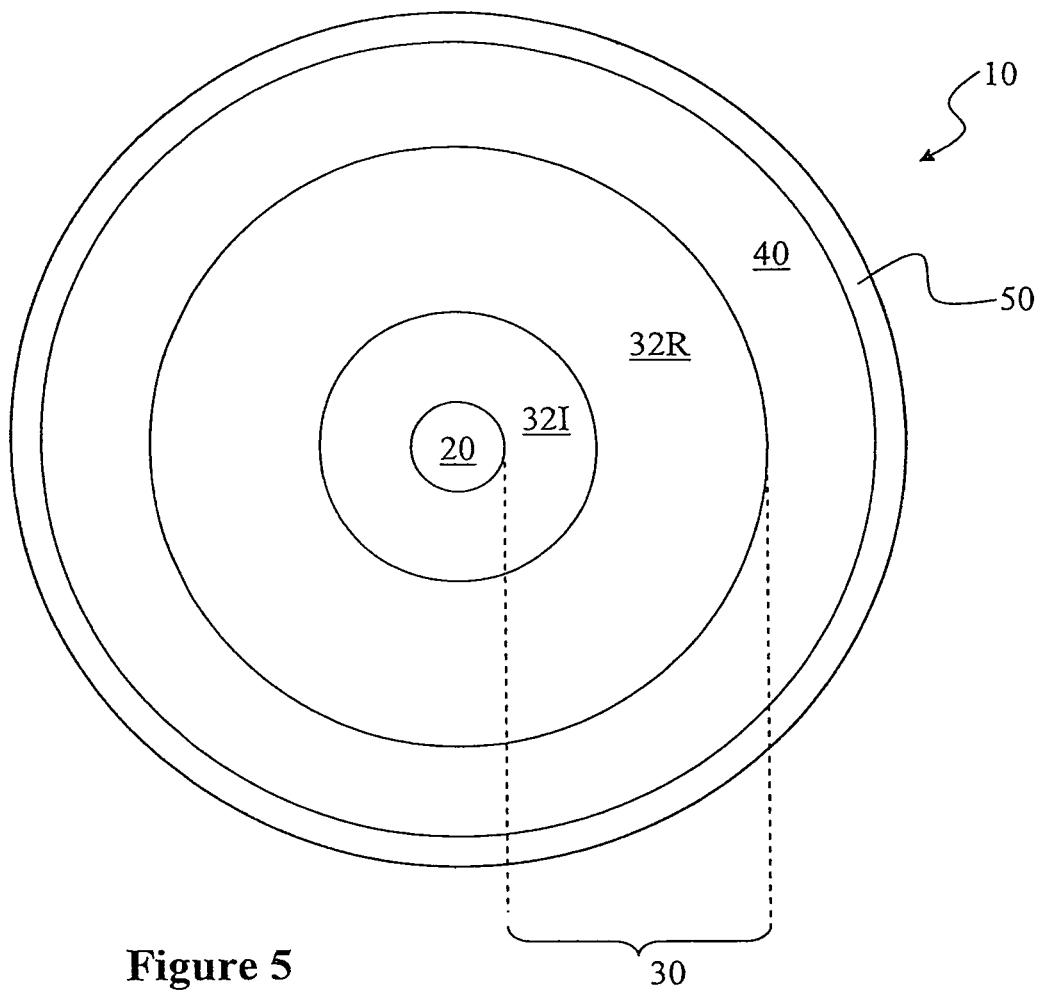
FIG. 5 is a cross-sectional view similar to that of FIG. 3, illustrating an example embodiment where the ring extends all the way to the outer cladding.
Figure 6:
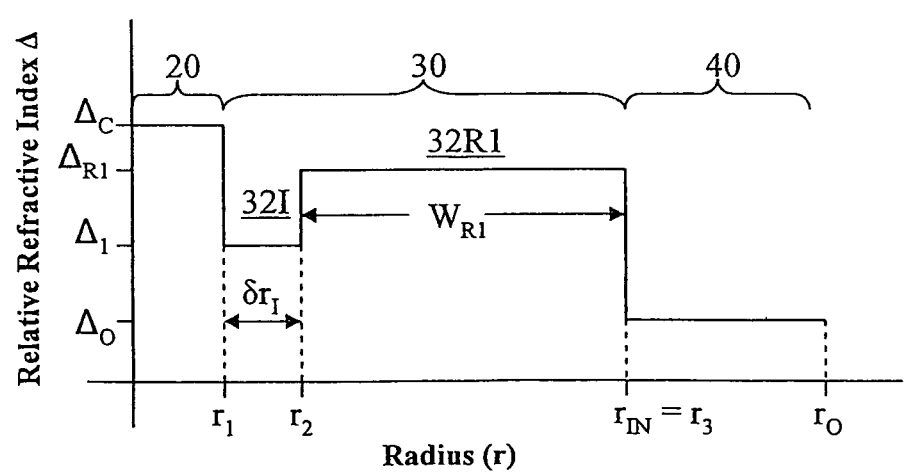
FIG. 6 is a plot similar to that of FIG. 4, but for the example embodiment shown in the cross-sectional view of FIG. 5.

FIG. 5 is a cross-sectional diagram similar to FIG. 3 illustrating an example embodiment of LMA optical fiber 10, wherein ring 32R1 extends all the way to outer cladding 40 (i.e., $\delta r_O \to 0$). FIG. 6 is a plot similar to that of FIG. 4 but corresponding to the example embodiment shown in FIG. 5. In the present example embodiment, $r_2 < 2r_1$. Further in the example embodiment, $\delta r_I < 15~\mu m$ and more preferable $\delta r_I < 10~\mu m$. Also in an example embodiment, $\delta r_I > 3~\mu m$.

Double-Ring LMA Optical Fiber Embodiment

Figure 7:
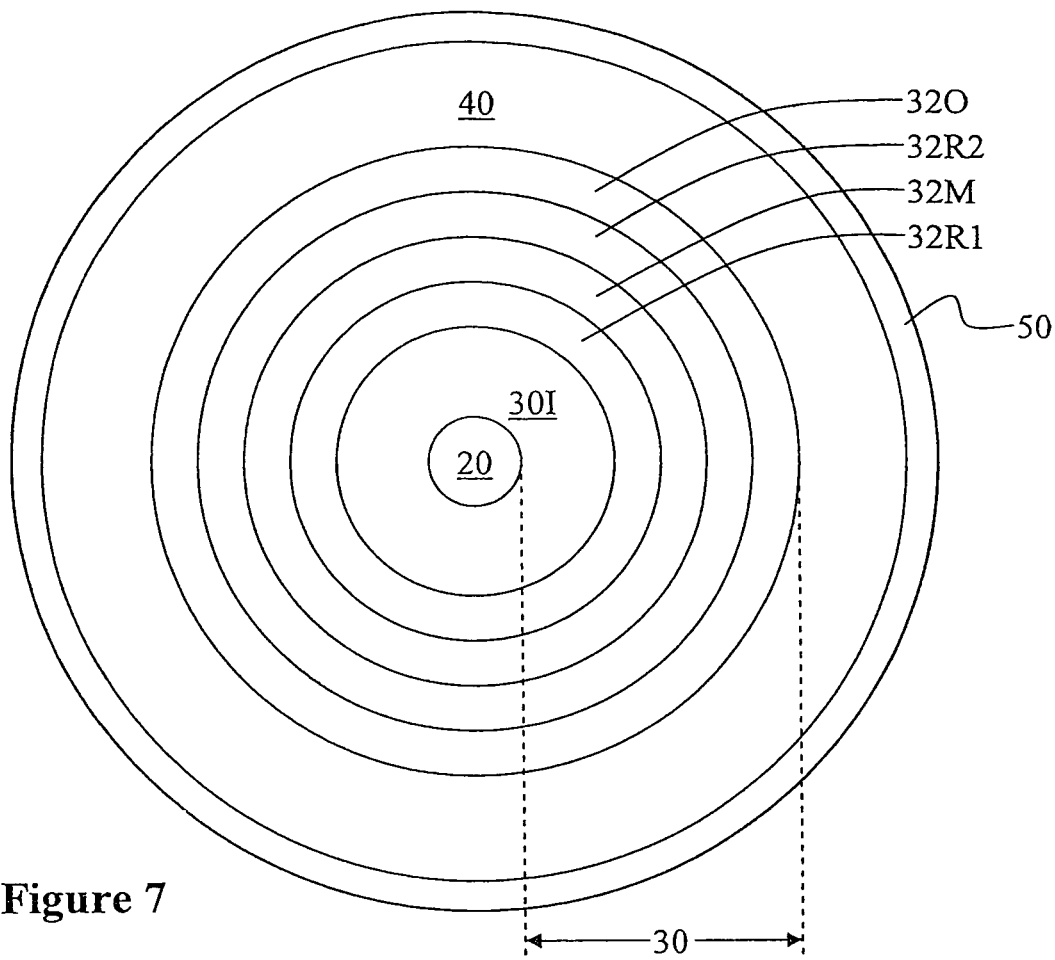
FIG. 7 is a cross-sectional view similar to that of FIG. 3, illustrating an example embodiment wherein the inner cladding includes two rings.
Figure 8:
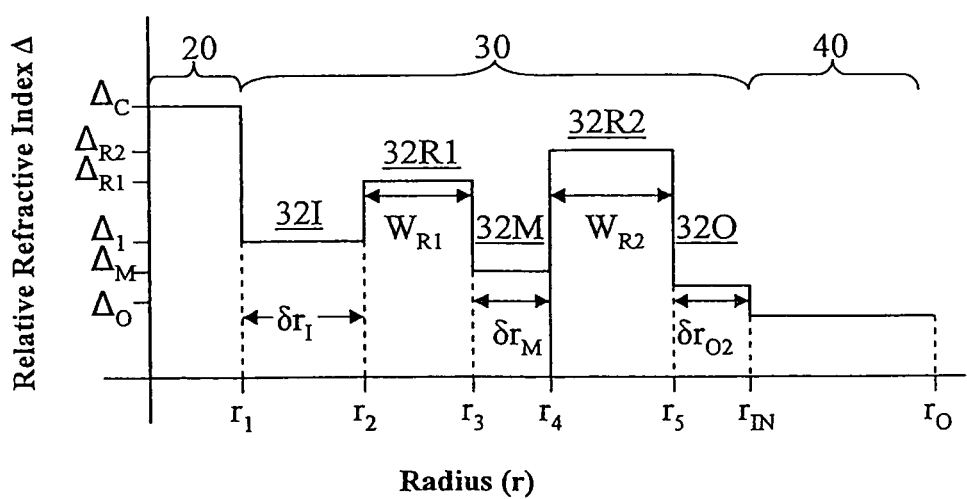
FIG. 8 is a plot similar to FIG. 4 but for the example embodiment shown in cross-sectional view of FIG. 7.

FIG. 7 is a cross-sectional diagram similar to that of FIG. 3, illustrating an example embodiment of LMA optical fiber 10 that includes two rings 32R1 and 32R2 formed in inner cladding 30. FIG. 8 is a plot similar to that of FIG. 4 but corresponding to the example embodiment shown in FIG. 7.

Ring 32R1 has an inner radius $r_2=r_1+\delta r_I$, an outer radius of $r_3=r_2 W_{R1}$, and a refractive index of $n_{R1}$ and thus an associated relative refractive index of $\Delta_{R1}$. Between rings 32R1 and 32R2 is a depressed annular region 32M having an inner radius $r_3=r_2+W_{R1}$, an outer radius of $r_4=r_3+\delta r_M$, and a refractive index of $n_M$ and thus an associated relative refractive index of $\Delta_M$. Ring 32R2 has an inner radius $r_4$, an outer radius $r_5=r_4+W_{R2}$, an index of refraction of $n_{R2}$ and thus an associated relative refractive index of $\Delta_{R2}$. In an example embodiment, $\Delta_{R1}=\Delta_{R2}$. Also in an example embodiment, $\Delta_1=\Delta_M$, and in another example embodiment, $\Delta_1=\Delta_M=\Delta_O$.

Figure 9:
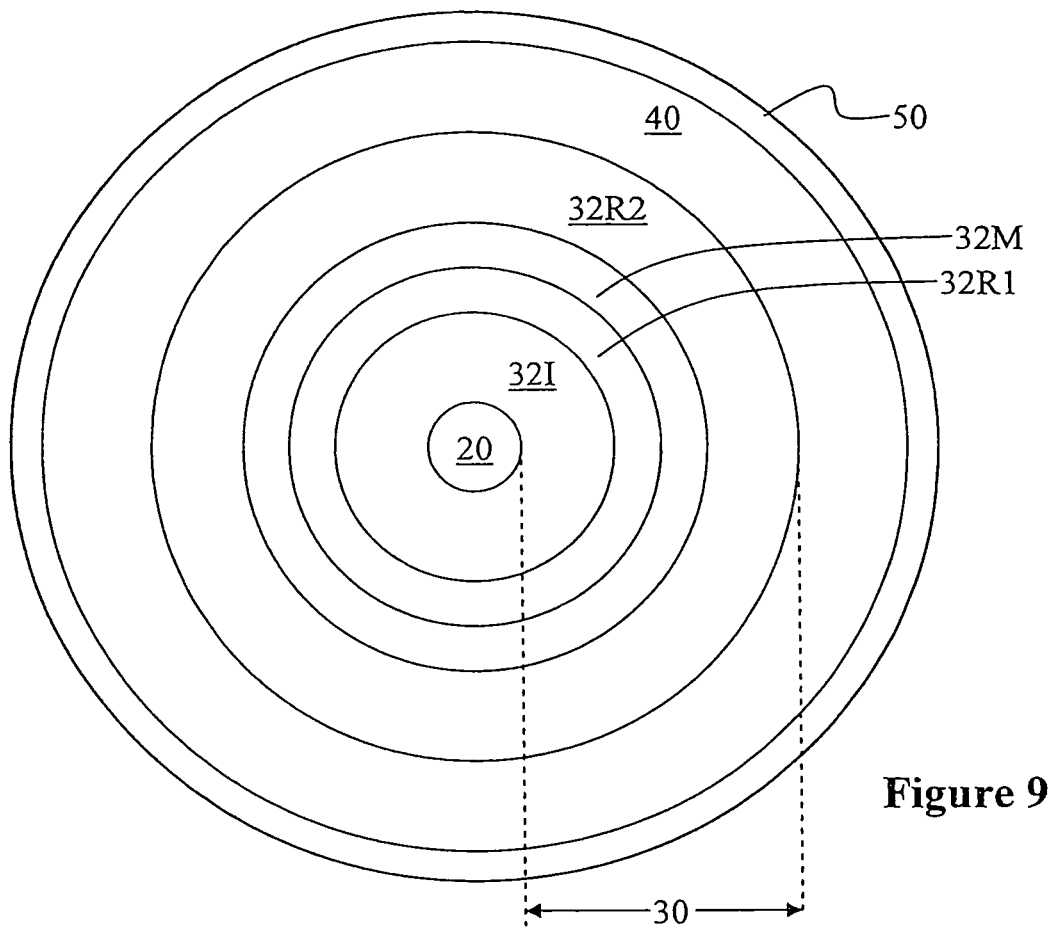
FIG. 9 is a cross-sectional view similar to that of FIG. 5 and FIG. 7, illustrating an example embodiment wherein second ring extends all the way to the outer cladding.
Figure 10:
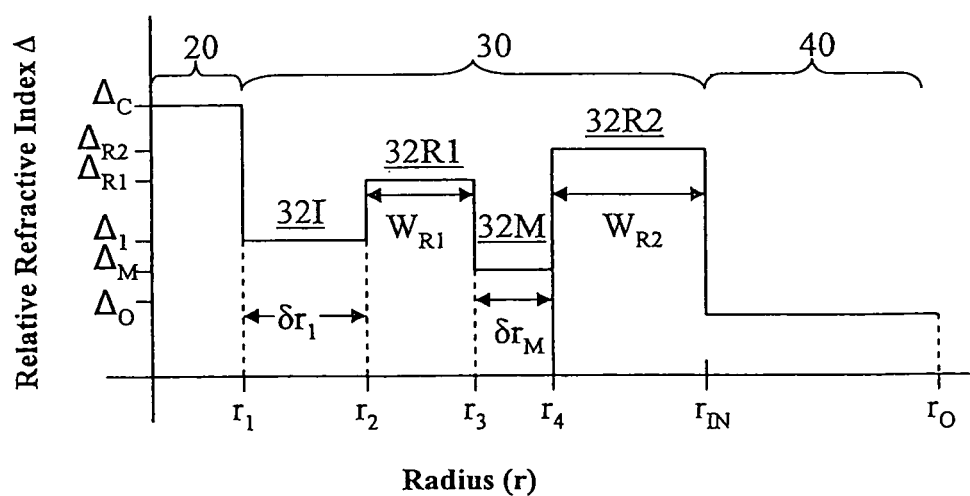
FIG. 10 is a plot similar to FIG. 6, but for the example embodiment shown in the cross-sectional view of FIG. 9.

FIG. 9 is a cross-sectional diagram similar to that of FIG. 7, but wherein outer ring 32R2 extends all the way to outer cladding 40, i.e., $\delta r_O \to 0$ in annular outer section 32O so that the annular outer section disappears, leaving $r_3=r_{IN}$. FIG. 10 is a plot similar to that of FIG. 8, but corresponds to the example embodiment shown in FIG. 9.

Triple Ring Embodiment

Figure 11:
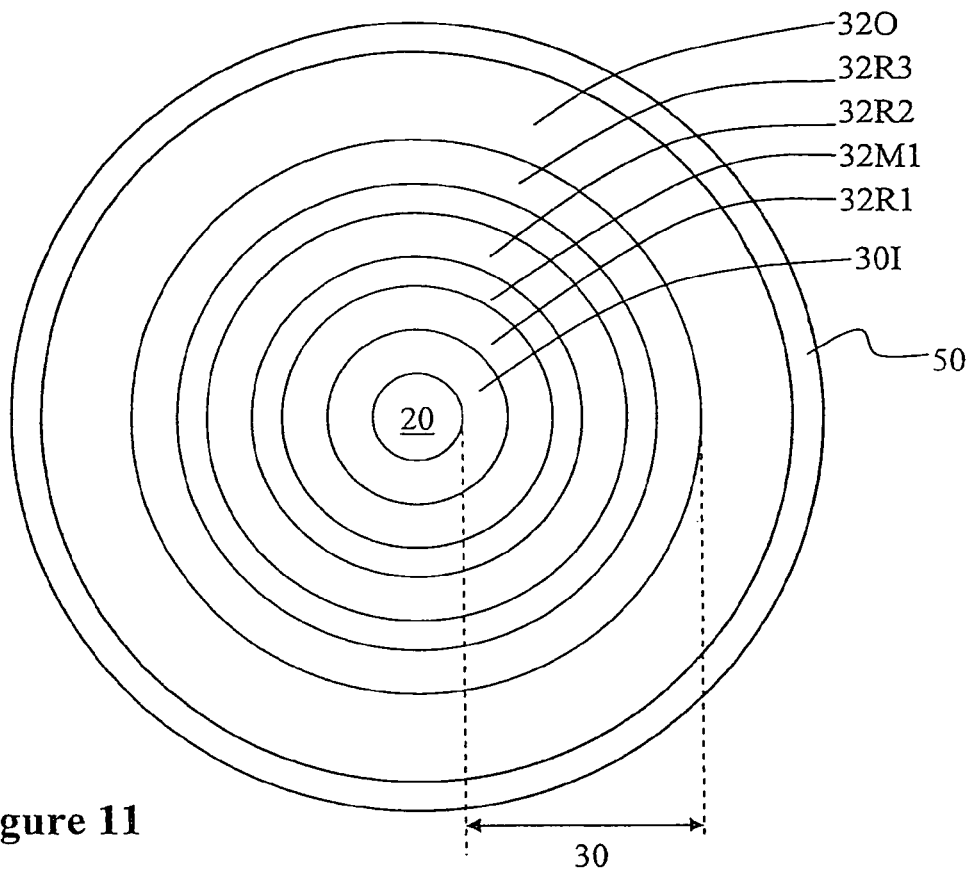
FIG. 11 is a cross-sectional view similar to that of FIG. 5 and FIG. 7, illustrating an example embodiment wherein the inner cladding includes three rings.
Figure 12:
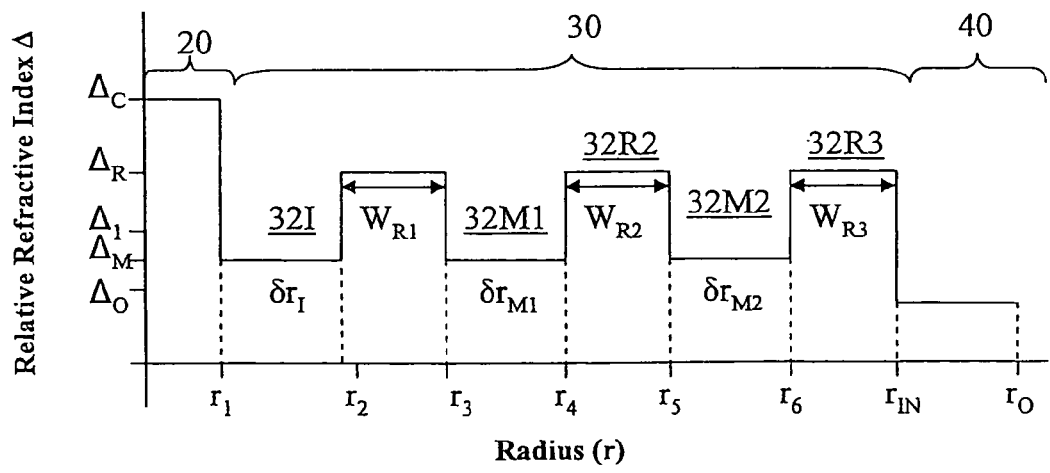
FIG. 12 is a plot similar to FIG. 10, but for the example embodiment shown in the cross-sectional view of FIG. 11.

FIG. 11 is a cross-sectional diagram similar to that of FIG. 5 and FIG. 7, illustrating an example embodiment of LMA optical fiber 10 that includes three rings 32R1, 32R2 and 32R3. FIG. 12 is a plot similar to that of FIG. 10, but that corresponds to the triple ring example embodiment shown in FIG. 11.

Ring 32R1 has an inner radius $r_2=r_1+\delta r_I$, an outer radius of $r_3=r_2+W_{R1}$, and a refractive index of $n_{R1}$ and thus an associated relative refractive index of $\Delta_{R1}$. Between rings 32R1 and 32R2 is a first depressed annular region 32M1 having an inner radius $r_3=r_2+W_{R1}$, an outer radius of $r_4=r_3+\delta r_{M1}$, and a refractive index of $n_{M1}$ and thus an associated relative refractive index of $\Delta_{M1}$. Ring 32R2 has an inner radius $r_4$, an outer radius $r_5=r_4+W_{R2}$, an index of refraction of $n_{R2}$ and thus an associated relative refractive index $\Delta_{R2}$.

Between rings 32R2 and 32R3 is a second depressed annular region 32M2 having an inner radius $r_5$, an outer radius of $r_6=r_5+\delta r_{M2}$, and a refractive index of $n_{M2}$ and thus an associated relative refractive index of $\Delta_{M2}$. Ring 32R3 has an inner radius $r_6$, an outer radius $r_{IN}=r_6+W_{R3}$, an index of refraction of $n_{R3}$ and thus an associated relative refractive index of $\Delta_{R3}$.

In an example embodiment, $\Delta_{R1}=\Delta_{R2}=\Delta_{R2}\equiv\Delta_R$. Also in an example embodiment, $\Delta_{M1}=\Delta_{M2}\equiv\Delta_M\geq\Delta_1$. In another example embodiment, inner cladding includes outer annular region 32O (FIG. 3 and FIG. 7) between outer cladding 40 and outer ring 32R3 having a width $\delta r_{O3}$ (in FIG. 11 and FIG. 12, $\delta r_{O3}=0$).

Forming the LMA Optical Fiber

In an example embodiment, core 20 and/or one, some or all of sections 32I, 32R (or 32R1 and 32R2; or 32R1, 32R2 and 32R3) and 32O (if present) of inner cladding 30 is/are comprised of silica doped with germanium, i.e. germania doped silica, while the outer cladding region 40 consists of pure silica. Dopants other than germanium, singly or in combination, may be employed within core 20 and/or inner cladding 30 to obtain the desired relative refractive index profiles discussed above as well as including those discussed below.

In some preferred embodiments, LMA optical fiber 10 contains no index-decreasing dopants. In other preferred embodiments, LMA optical fiber 10 contains both one or more index-increasing dopants and one or more index-decreasing dopants.

In an example embodiment, outer cladding 40 contains no germania or fluorine dopants therein. In an example embodiment, outer cladding 40 is pure or substantially pure silica. In another example of embodiment, outer cladding 40 contains fluorine dopant. Outer cladding 40 may, in an example embodiment, be comprised of a cladding material that is deposited, for example during a laydown process, or that is provided in the form of a jacketing, such as a tube in a rod-in-tube optical preform arrangement, or a combination of deposited material and a jacket. Outer cladding 40 may include one or more dopants.

In example embodiments, some or all of the different regions that make up LMA optical fiber 10 as disclosed herein are made by a vapor deposition process. Even more preferably, fabrication of some or all of LMA optical fiber 10 includes using an outside vapor deposition (OVD) process. Thus, for example, known OVD laydown, consolidation, and draw techniques may be advantageously used to produce the optical fiber disclosed herein. Other processes, such as modified chemical vapor deposition (MCVD) or vapor axial deposition (VAD) or plasma chemical vapor deposition (PCVD) may be used, either alone or in combination with any other deposition process. Thus, the refractive indices and the cross sectional profile of the optical fibers disclosed herein can be accomplished using manufacturing techniques known to those skilled in the art including, but in no way limited to, OVD, VAD and MCVD processes.

Passive and Active LMA Optical Fiber Embodiments

In an example embodiment, LMA optical fiber 10 is passive, meaning that core 20 does not include dopants (e.g., one or more rare-earth dopants) to the extent that the core becomes a gain medium. The passive embodiment of LMA optical fiber 10 is suited for power transfer and like applications where optical amplification is not called for. For this application, the core may be doped with at least one dopant, such as Ge, Al, P, to increase the core refractive index.

In another example embodiment, LMA optical fiber 10 is active, meaning that core 20 includes at least one dopant (e.g., one or more rare-earth dopants) to the extent that the core becomes a gain medium. This active embodiment of LMA optical fiber 10 is thus suited for applications where optical amplification is called for, such as for fiber lasers and optical fiber amplifiers (e.g., Erbium-doped fiber amplifiers (EFDAs)). The at least one dopant in the core 20 includes, for example, Nd, Yb, Er, Ho, Tm, Pr. For example, when core 20 is doped with Yb, it absorbs pump light at wavelengths ranging over 900~980 nm and generates gain at wavelengths ranging over 976~1100 nm. Core 20 can also be doped with two dopants, for example a core doped with Yb and Er absorbs pump light at wavelength ranging over 900~980 nm and generates gain at wavelengths ranging over 1520~1600 nm.

Figure 13:
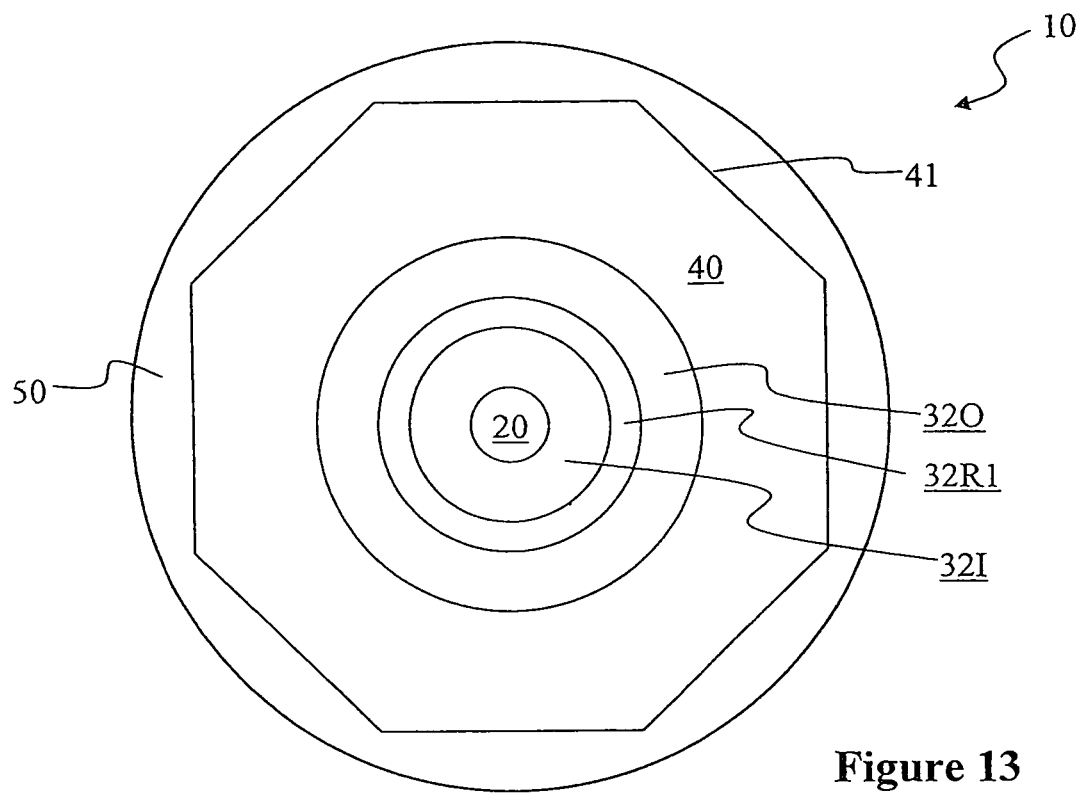
FIG. 13 is a cross-sectional view similar to that of FIG. 3 but with a non-circular pump cladding to improve pump absorption for active fibers.
Figure 16A:
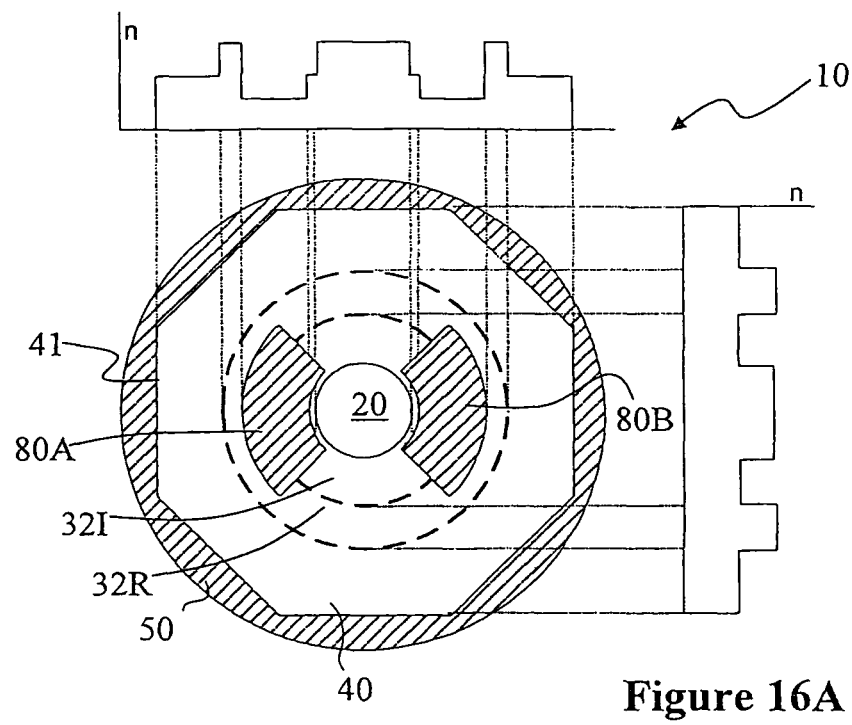
FIG. 16A and FIG. 16B are cross-sectional views similar to FIG. 5, illustrating example polarization-maintaining embodiments of the LMA optical fiber of the present invention.
Figure 16B:
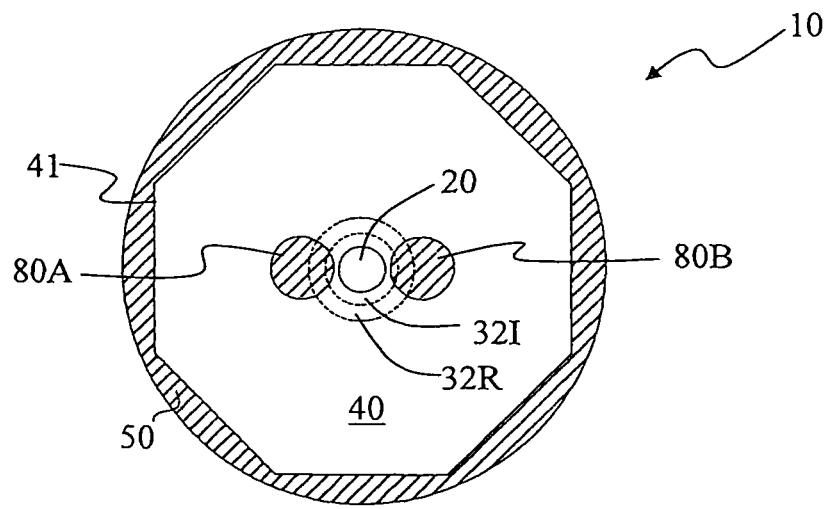

In an example embodiment of active LMA optical fiber 10, outer cladding 40 has a perimeter 41 that is non-circular, e.g., is polygonal as shown in FIG. 13. Non-round outer cladding perimeters 41 are also illustrated in FIG. 16A and FIG. 16B discussed below. Non-circular perimeter 41 of outer cladding 40 is required for improving pump light absorption since it eliminates skew modes, which are the modes that never pass through the core during propagation along the fiber and thus are non-absorbable modes for the rare-earth-doped core. The non-circular shape mentioned hereby may include, but is not limited to, for example polygon, D-shapes, a combination of curvatures and polygonal. For inactive LMA optical fiber 10, outer cladding perimeter 41 can be any shape. In general, LMA optical fiber 10 has a circular perimeter 41 as this shape does not require additional processing for preform re-shaping.

Example optical systems that make use of passive and active embodiments of LMA optical fiber 10 are discussed in detail below.

LMA Optical Fiber with Resonant Bending Conditions

A key characteristic of LMA optical fiber 10 of the present invention is that is provides for single-mode operation with either no bending or at a relative large select bend diameter $D_B$. The importance of this key characteristic can be appreciated by examining the performance of LMA optical fibers under tight bending conditions (i.e., small bend diameters).

The typical LMA optical fiber has a core relative refractive index $\Delta_C$ of between 0.05% and 0.1%. In order to achieve a large mode area, such fibers need to have very large core diameter, which typically ranges from 10 microns to 50 microns. As a result, the LMA optical fiber becomes multimode. In a fiber laser, this makes the laser beam quality factor $M^2$ large, indicating poor laser beam quality.

To eliminate the higher-order modes, the LMA optical fiber is bent by a select amount to induce leaky mode loss for the higher order modes while maintaining a lower leaky mode loss for the fundamental mode. However, when the core diameter is sufficiently large (e.g., 30 microns) and the core relative refractive index $\Delta_C$ (%) is relatively small, (e.g., 0.0868% for a 0.06 core NA), there is no bend diameter that will keep the fundamental mode with small leaky mode loss $\alpha_F < 1$ dB/m but suppress the higher order modes by having leaky mode loss $\alpha_H > 10$ dB/m. In other words, one cannot find a bend diameter such that that the differential leaky mode loss $\Delta\alpha$ between the fundamental core mode and the higher order modes is sufficiently large (e.g., $\Delta\alpha \geq 10$ dB/m) to effectuate single-mode operation in the optical fiber. With the fiber structures proposed in the present invention, at certain bend diameters, the differential attenuation can be enhanced significantly. Such a bend diameter is referred to herein as a "resonant" bending condition.

a. Computer Modeling and Experimental Results

In designing the LMA optical fiber of the present invention, the inventors used numerical modeling, and conducted experiments to confirm the modeling results. In particular, finite element methods based on fully vectorial Maxwellian equations were used to model the optical properties of the LMA optical fiber 10 of the present invention.

Wavelengths of particular interest in connection with the LMA optical fiber 10 of the present invention along with its related applications (discussed below) include those wavelengths between 1030 nm and 1070 nm. All computer modeling discussed hereinbelow was performed using a wavelength of 1066 nm. However, the results obtained are applicable to a wide wavelength range or other wavelengths for different applications with the appropriate adjustments as will be apparent to those skilled in the art.

The bending of an optical fiber can be considered as geometrical distortion described by a conformal transformation. Thus, the bent (curved) fiber is replaced by a straight fiber with equivalent refractive index distribution, i.e., $$n_{eq}(x, y) = n(x, y)\exp\left(\frac{p}{R}\right) \quad (1)$$

where p=x or y, depending on the bending direction, and R stands for the effective bend radius ($R=D_B/2$, where $D_B$ is the bend diameter). In the numerical modeling discussed herein, the bending direction was chosen to be the x direction. When an optical fiber is bent, its refractive index distribution becomes tilted and the cladding relative refractive index in certain regions can be higher than the core relative refractive index. This results in leaky mode loss for the core modes.

In practice, the LMA optical fiber is surrounded with other materials in an effectively infinite domain. Yet, the finite element method only deals with a finite domain. However, the loss of the optical wave due to the infinite space in the direction normal to the interface of the fiber outer surface was emulated by the inventors by using a perfectly matched layer (PML) immediately outside of the optical fiber and employing a cylindrical coordinate system.

The complex effective index for each mode was obtained, and the effective index of each mode converted into the corresponding effective propagation constant, β, which is to the effective index via the simple relation, $$\beta = \frac{2\pi}{\lambda}n_{eff}.$$

The imaginary part of the propagation is related to the leaky mode loss in an equation defined as follows, $$\alpha = \frac{20}{\ln(10)}\text{Im}(\beta) \quad (2)$$

The unit for leaky mode loss α is dB/m. For most fiber laser applications, a fiber loss of less than around 1 dB/m is acceptable. The outer cladding is ignored in the computer simulations because it has little effect on the property of the optical fiber being considered.

The bending loss for an LMA optical fiber with a step-index core of diameter $d_C=2r_1=30$ µm, $\Delta_C$ (%)=0.0868% and no ring present was modeled for different bend diameters $D_B$. Table 1 below shows modeling results for an example LMA optical fiber similar to the example discussed immediately above, with $\Delta_C$ (%)=0.0868% and $d_C$=30 microns. At bend diameters $D_B$ of 10 cm and 8 cm, both the FM loss and the loss of FHOM are low. At $D_B$=6 cm, both the FM and FHOM loss increases to an unacceptable level. The optimal (resonant) bend diameter for this LMA optical fiber is $D_B$=8.4 cm, where the FM loss is only 0.38 dB/m, while the FHOM loss is a relatively high 8.43 dB/m. The data indicate that the optimum loss differential is a relatively sensitive function of bend diameter $D_B$. At such a small bend diameter $D_B$=8.4 cm, the fiber becomes single mode, but the effective area is reduced by more than 50%.

TABLE 1

Bending loss of a LMA optical fiber with a 30 micron core and no ring 32R for different bend diameters.

| Bending Diameter (cm) | Loss of FM (dB/m) | Loss of FHOM (dB/m) |
|---|---|---|
| 6 | 18 | 46 |
| 8 | 0.9 | 1.9 |
| 8.4 | 0.38 | 8.43 |
| 10 | 0.04 | 1.6 |

The computer simulations and experiments carried out by the inventors indicate that while one can cause an LMA optical fiber to operate at a single mode via bending, this approach only works for optical fibers having a relatively small core diameter and relatively small bend diameters. Accordingly, at least one ring 32R is needed to allow for larger core diameters $d_C$ in combination with larger bend diameters $D_B$.

Function of Ring Region

A key function of the one or more rings 32R in LMA optical fiber 10 is to introduce controlled leaky mode loss of the core modes. In an example embodiment, this is accomplished in conjunction with bending the optical fiber. The controlled leaky mode loss is kept relatively low for the fundamental mode (e.g., $\alpha_F$ less than 1 dB/m), while at the same time is much higher for the higher-order modes (e.g., $\alpha_H$ preferably greater than 5 dB/m, more preferably greater than 10 dB/km, and even more preferably greater than 15 dB/m) at a relatively large bend diameter $D_B$.

Ring 32R itself can form a waveguide, which is not desirable in certain cases. In particular, when LMA optical fiber 10 is used as a passive conduit for optical power delivery, the trapped ring modes can mix with the FM and degrade the beam quality. The problem is less severe for the active embodiment of LMA optical fiber 10. Light traveling outside core 20 will not experience gain and therefore will be quickly lost. Bending can help to suppress the guided modes trapped inside ring 32R, but bending can also have similar effect on the core guided modes.

To suppress the ring modes, in an example embodiment the ring width $W_R$ is chosen so that there is significant bending loss for the ring modes as well as the higher order modes in the core. The ring modes are of much less concern than the core higher order modes. For both the active and passive LMA optical fiber embodiments of the present invention, the chances of launching ring modes and the percentage of light that can be launched into the ring mode are very small because they are off fiber center line 16, and signal light carried by the LMA optical fiber is always launched on center.

As mentioned above, LMA optical fiber 10 can have more than one ring, such as the double-ring embodiment discussed above in connection with FIG. 7 through FIG. 10, and the triple-ring embodiment discussed in connection with FIG. 11 and FIG. 12. Multi-ring embodiments, such as the aforementioned two-ring and three-ring embodiments, can be used to avoid having a single wide ring that can trap a large number of ring modes and that may not be sufficiently lossy under bending conditions.

Consider the above example embodiment of the "no ring" LMA fiber 10 having $d_C$=30 µm, $\Delta_C=\Delta_R$=0.0868%, but that now includes a single ring 32R having a ring inner radius $r_2$=25 µm ($\delta r_I$=10 µm), and a ring width $W_R$=50 microns. At a bend diameter $D_B$=28 cm, the FM leaky mode loss is $\alpha_F$=0.000978 dB/m, while the FHOM leaky mode loss is $\alpha_H$=21.3 dB/m. Thus, compared with the design without the ring, the presence of ring 32R increased the optimum bend diameter from $D_B$=8.4 cm to $D_B$=28 cm.

Ring Parameters

Using as a reference the example embodiment of the single-ring LMA optical fiber 10 discussed immediately above, the inventors conducted comprehensive modeling to explore the limitations of the ring-related parameters. The inventors found that the closer the left ring edge is to the core edge (i.e., the closer $r_2$ is to $r_1$, or the smaller the value of $\delta r_I$), the sooner the bending loss occurs (i.e., the larger the value of $D_B$ that provides single-mode operation). However, there needs to be some separation between the core and the innermost ring (i.e., $\delta r_I > 0$). In an example embodiment, 3 µm < $\delta r_I$ < 15 µm.

For example, in the example LMA optical fiber under consideration, if $r_2$ is adjusted to be 20 µm while the ring width $W_R$ remains at 50 µm (so that $\delta r_I$=5 µm), both the FM and FHOM losses are higher than 22 dB/m at $D_B$=28 cm. This attenuation $\alpha_F$ for the fundamental mode is too high for practical applications. The ring width $W_R$ also needs to be carefully chosen, with the optimal width depending on whether LMA optical fiber 10 is passive or active. For the passive embodiment, the ring width $W_R$ should be chosen so that most of the ring modes will be suppressed when bent to the select bend diameter $D_B$. For example, the ring width $W_R$ is preferred to have a width of less than $(2.5)d_C$ and preferably does not reach the edge of the inner cladding (i.e., $r_1 < r_2$, or stated differently $\delta r_I > 0$, and preferably $\delta r_I > 3$ µm).

The ring-width requirement is less critical for active embodiments of LMA optical fiber 10 because light guided outside of the doped core will not experience amplification and thus has very little impact on amplifier performance. This provides additional flexibility in designing an active LMA optical fiber. By widening the ring width $W_R$ to 100 microns and keeping $r_2$=25 microns, the optimal bend diameter $D_B$=32 cm, where the leaky mode loss of FM is 0.13 dB/m while the leaky mode loss of FHOM is 24.7 dB/m.

Consider now a single-ring LMA optical fiber 10 having $d_C$=40 µm, $\Delta_C=\Delta_R$=0.0868%, with inner ring radius $r_2$=30 µm (so that $\delta r_I$=10 µm) and $W_R$=55 µm. The bending losses at three different bend diameters $D_B$ are presented in Table 2, below. When $D_B$ is 20.4 cm, the FM loss $\alpha_F$ is about 1 dB/m while the FHOM loss $\alpha_H$ is 5.6 dB/m. In this case, the relative attenuation $\alpha_r$ is 5.6: Once again, the leaky mode loss behavior sensitively depends on the bend diameter $D_B$. The optimal bend diameter $D_B$ resides in a narrow bend diameter window around 20 cm.

The above-described example LMA optical fiber 10 is now adjusted to improve performance. Specifically, $r_3$ is set to 100 μm so that $W_R$=70 μm. The results are presented in Table 3, below. It is found that for $D_B$=25.6 cm, the FM leaky mode loss $\alpha_F$=0.23 dB/m while the FHOM leaky mode loss $\alpha_H$=12.8 dB/m, so the relative attenuation $\alpha_r$>56. With the optimal $D_B$=25.6 cm, the mode field size is also increased.

It should be noted that sometimes it can be difficult to implement a fiber index profile precisely according to the idealized target. However, under normal circumstances the bend diameter $D_B$ can be quickly tuned to arrive at the optimal bend diameter, which typically will only be slightly different than the original target (idealized) bend diameter.

TABLE 2

The bending loss of a 40 micron core LMA optical fiber with a single ring for different bend diameters ($r_2$ = 30 μm, $r_3$ = 85 μm)

| Bending Diameter (cm) | Loss of FM (dB/m) | Loss of FHOM (dB/m) |
|---|---|---|
| 20 | 2.3 | 10.7 |
| 20.4 | 1.08 | 5.6 |
| 21 | 0.47 | 2 |

TABLE 3

The bending loss of a 40 micron core LMA optical fiber with a single ring for different bend diameters ($r_2$ = 30 μm, $r_3$ = 100 μm).

| Bending Diameter (cm) | Loss of FM (dB/m) | Loss of FHOM (dB/m) |
|---|---|---|
| 21.6 | 29.8 | 9.7 |
| 24 | 8.65 | 5.68 |
| 25 | 0.55 | 7.03 |
| 25.6 | 0.23 | 12.8 |

In the modeling results described above, the effect beyond the inner cladding has been ignored. Structures beyond the inner cladding—for example, outer cladding 40, and additional coating 50 including the primary coating and secondary coating—can play a non-trivial role in the bending properties of the optical fiber. However, those skilled in the art will appreciate that such effects do not significantly impact the modeling results presented herein.

Experimental Results

Experiments conducted on LMA optical fibers made in accordance with the present invention shown very good agreement with the computer modeling results presented above. A LMA optical fiber 10 having a core diameter $d_C$=30 um and a measured refractive index profile Δ(%) vs. radius r (μm) as shown in the plot of Δ(%) versus radius r of FIG. 14 was used for beam quality measurement. The plot of FIG. 14 was obtained through a refracted near-field (RNF) measurement. A single-mode fiber laser lasing at 1060 nm was used as a light source to illuminate LMA optical fiber 10. The laser beam from the fiber laser was butt coupled into the LMA optical fiber with a nanopositioning stage. The outer cladding mode was stripped by using high index oil applied to the outer cladding.

Figure 15A:
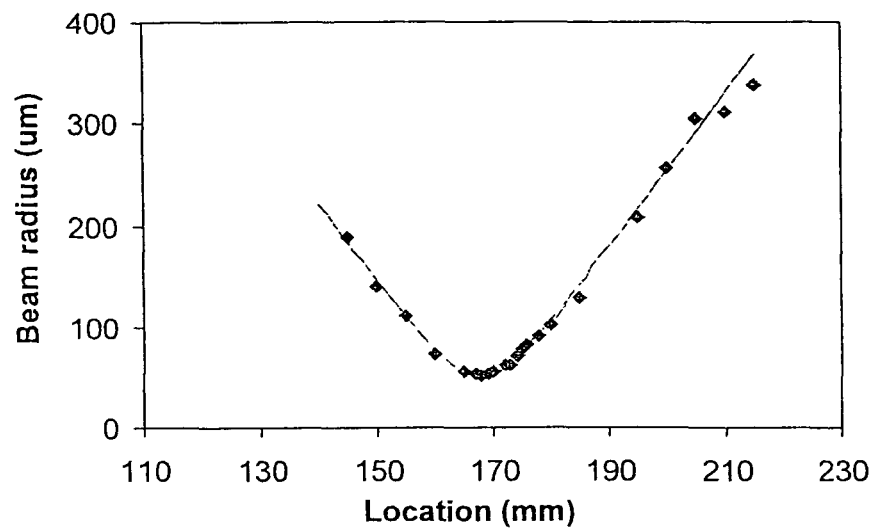
FIG. 15A is a plot of the measured beam radius ($\mu$m) vs. location (mm) for an example LMA optical fiber having a bend diameter $D_B$=16 cm.
Figure 15B:
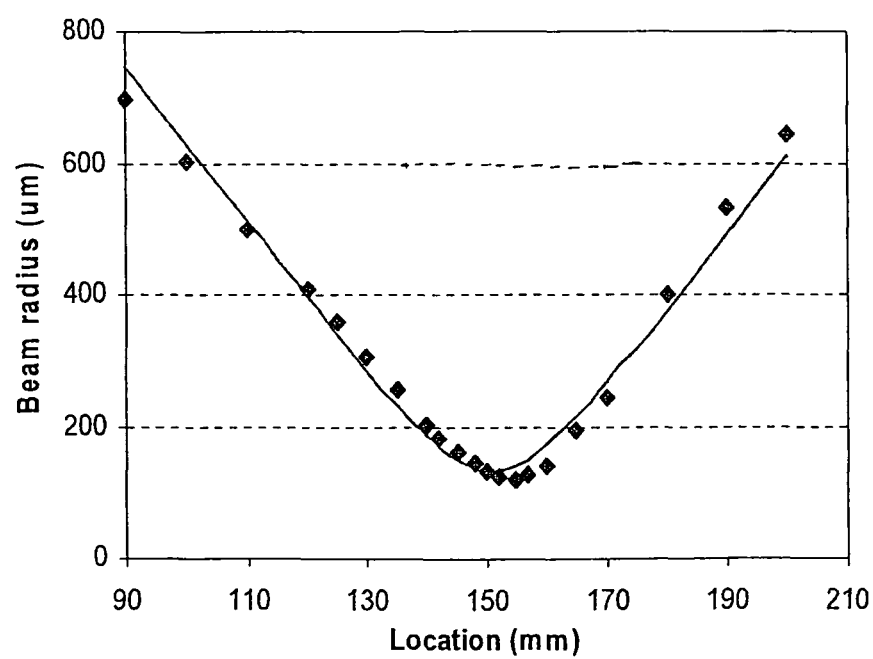
FIG. 15B is a same plot as FIG. 15A but for a bend diameter $D_B$=32 cm.

The measured beam quality at two different bend diameters $D_B$=16 cm and $D_B$=32 cm is shown in the respective plots of beam radius (μm) vs. location (mm) in FIG. 15A and FIG. 15B. With reference to FIG. 15A, when the LMA optical fiber was bent to $D_B$=16 cm diameter, a diffraction limited beam corresponding to a single mode output was observed. With reference now to FIG. 15B, when the bend diameter is increased to $D_B$=32 cm, the beam was degraded to 4.8 times the diffraction limit, which corresponds to a combination of a number of high-order modes in the output beam. (Note: The rhombus symbol stands for the measured values, and a solid line represents a fitted curve.)

Compared with conventional LMA optical fibers with the same core diameter $d_C$, the LMA optical fiber of the present invention does not require tight bending to achieve single-mode operation. In an example embodiment, 9 cm≤$D_B$≤40 cm. This unique property not only increases the effective MFD and thus the ability to carry high power without incurring detrimental non-linear effects, but also reduces the risk of fiber damage due to pump light leaking from the tight bend. As a result, a RE-doped LMA optical fiber, when used in a fiber laser, can generate much higher output power and a high-quality diffraction-limited beam from single-mode light without being limited by onset of detrimental nonlinear effects.

Polarization-Maintaining Embodiments

Polarization management is a critical issue for both the active and the passive LMA fibers as used in high power fiber lasers. A linearly polarized laser output facilitates power combining and wavelength conversion applications.

FIG. 16A and FIG. 16B are cross-sectional views of LMA optical fiber 10 similar to that shown in FIG. 5, but wherein the LMA optical fiber includes stress-inducing regions 80A and 80B that render the optical fiber polarization maintaining. In the example embodiment of FIG. 16A, the stress-inducing regions are in the form of "bow-tie" cross-section rods, while in FIG. 16B are in the form of circular-cross-section rods. Two refractive-index profiles are shown in FIG. 16A for two different cross-sections. The refractive-index profiles are the same for FIG. 16B. In the example embodiments shown in FIG. 16A and FIG. 16B, outer cladding 40 has a polygonal (e.g., hexagonal) outer perimeter 41, which serves to enhance the polarization-maintaining effect.

Stress-inducing region 80A and 80B are arranged diametrically opposed relative to core 20 and are formed of a glass material having a thermal coefficient of expansion (TCE) different from that of the surrounding material. Stress-inducing regions 80A and 80B also preferably have a refractive index lower than that of the surrounding material so that they do not form the core of a waveguide.

When such a fiber is drawn, the longitudinally-extending stress-inducing regions 80A and 80B and the surrounding material shrink by different amounts, whereby regions 80A and 80B are put into a state of tension or compression strain. Strain-induced birefringence (otherwise referred to a stress-induced birefringence) is imparted in the fiber and thereby reduces coupling between the two orthogonally polarized fundamental modes.

Embodiments where $D_B \rightarrow \infty$ (No Bending)

As discussed above, example embodiments of LMA optical fiber 10 of the present invention do not require bending (i.e., $D_B \rightarrow \infty$) in order to strip away the higher-order modes and leave the fundamental mode propagating in core 20. Rather, the higher-order modes tunnel out of straight core 20 so that LMA optical fiber 10 behaves like a single-mode fiber.

To illustrate the design concept, the tunneling loss of the LP11 mode (i.e., FHOM) and the LP01 mode (i.e., FM) was calculated for different core diameters $d_C$=20, 30 and 50 μm for the example embodiment of LMA optical fiber 10 illustrated in FIG. 5 and FIG. 6. In the calculation, the core relative refractive index $\Delta_C=0.1\%$ and $\Delta_C=\Delta_{R1}$.

Figure 17A:
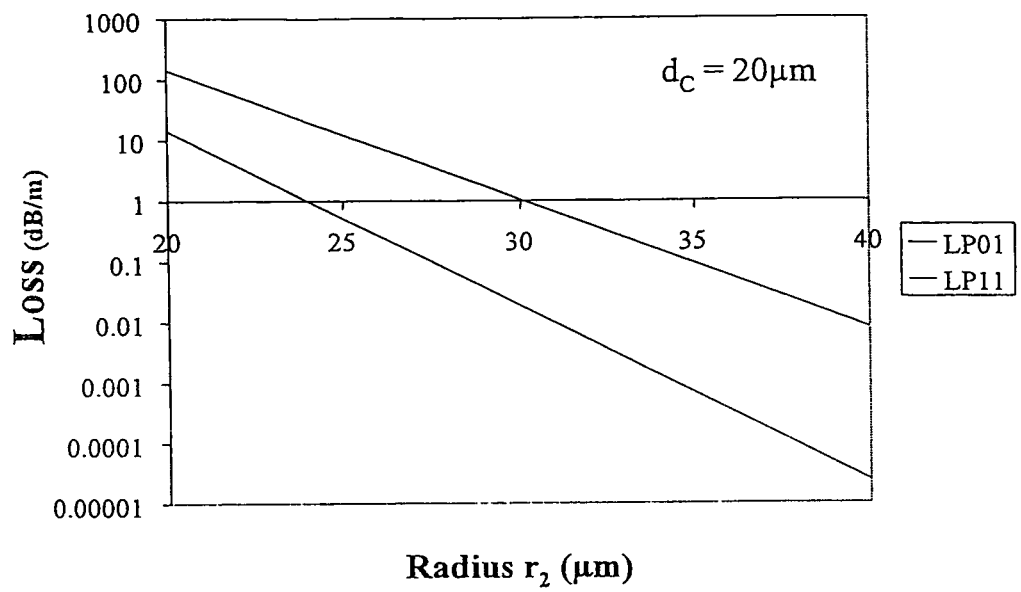
FIG. 17A is a plot of loss (dB/m) vs. ring inner radius $r_2$ for the single-ring embodiment illustrated in FIG. 5 and FIG. 6 for the LP01 and LP11 modes for $d_C$=20 $\mu$m.
Figure 17B:
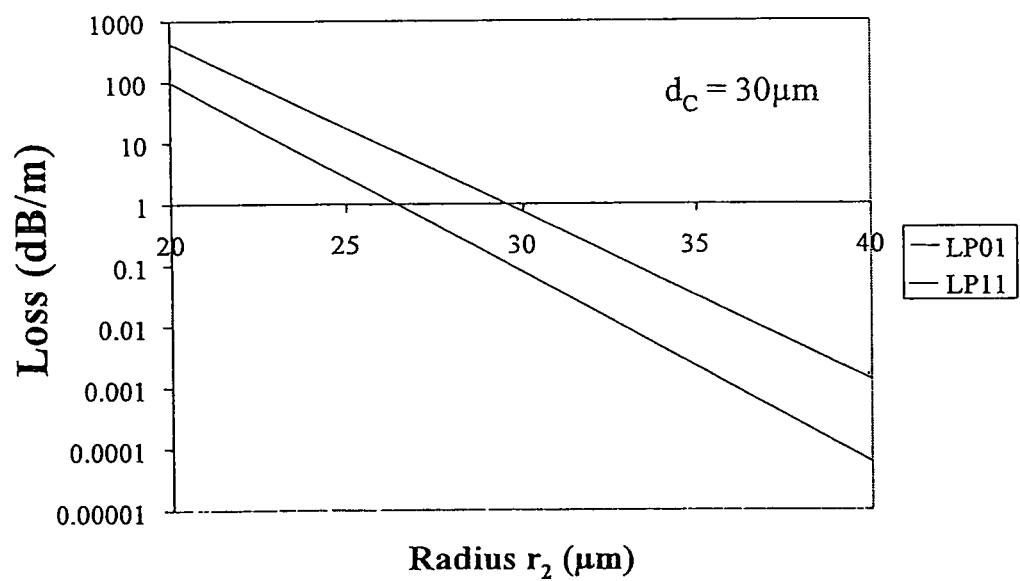
FIG. 17B is the same plot as FIG. 17A but for $d_C$=30 $\mu$m.
Figure 17C:
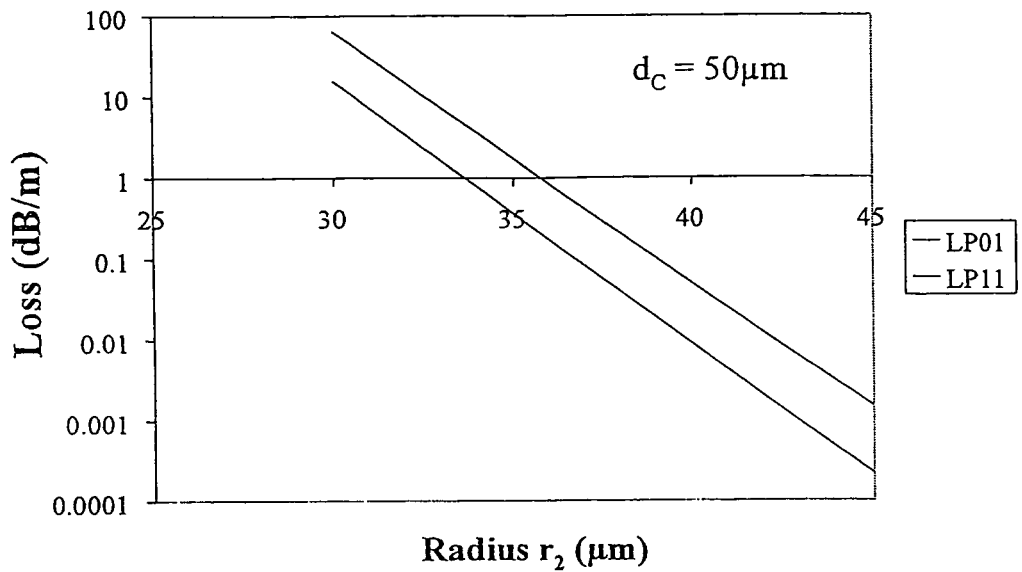
FIG. 17C is the same plot as FIG. 17A but for $d_C$=50 $\mu$m.

FIG. 17A, FIG. 17B and FIG. 17C respectively show plots of the tunneling loss α (dB/m) as a function of radius $r_2$ (i.e., the inner radius of ring 32R1). It can be seen from the plots that by changing radius $r_2$, the LP01 mode loss $α_F$ can be low while the loss $α_H$ of LP11 mode is much higher. For example, in FIG. 17A, for $d_C$=20 μm, if $r_2$=27.5 μm, the LP01 mode loss $Δ_F$=0.1 dB/m, but the LP11 mode loss $Δ_H$=3 dB/m. In this example the relative attenuation between the LP11 mode and the LP01 mode is 30. For larger-core fiber, the loss contrast becomes smaller. For the 30 μm core fiber of FIG. 17B, the relative attenuation $α_r$ is reduced to 10, and for the 50 μm core fiber of FIG. 17C, the relative attenuation is about 5.

Thus, LMA optical fiber 10 needs not have a bend to have a sufficient relative attenuation $α_r$ if the position (i.e., radius $r_2$) of ring 32R1 is accurately controlled. However, if radius $r_2$ is larger than the target value, the loss $α_H$ of the LP11 mode may not be sufficiently high. In this case, bending can be used to further increase $α_H$ as described above. But also as discussed above, the bend diameter $D_B$ required to achieve single-mode operation is relatively large so that the effective mode area reduction caused by fiber bending is not as large as the reduction associated with smaller-radius bending.

Figure 18:
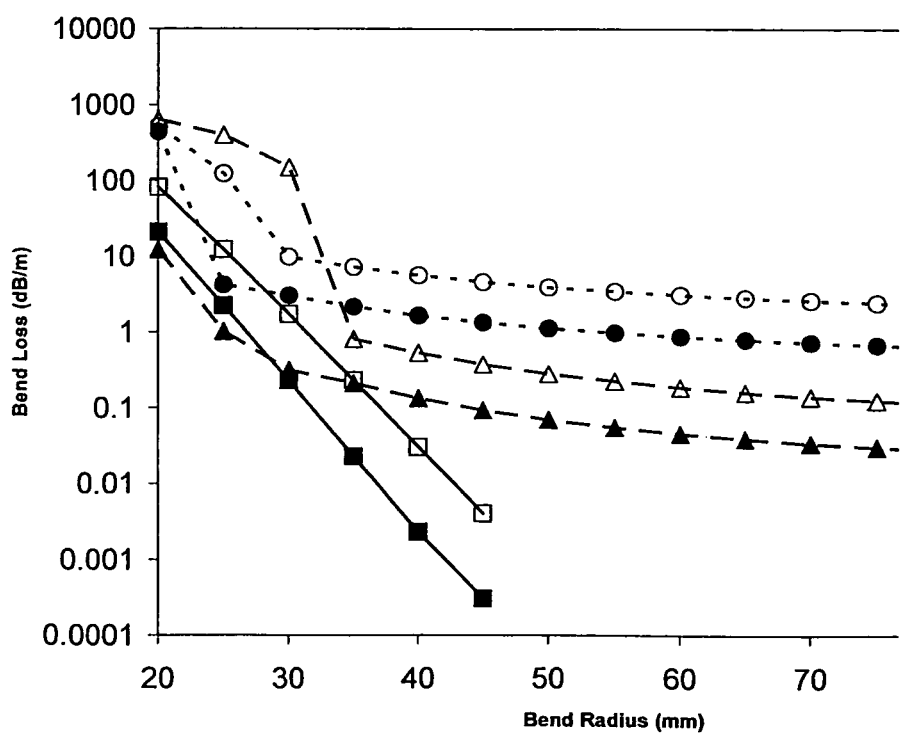
FIG. 18 is a plot of the bend loss (dB/m) vs. bend radius ($D_R$/2) for a variety of different optical fiber geometries for $d_C$=50 $\mu$m.

FIG. 18 plots the bending loss α (dB/m) as a function of bending radius ($D_B/2$) for an example embodiment of LMA optical fiber 10 with $d_C$=50 μm core with matched cladding, and two 50 μm core fibers with $r_2$=35 and 40 μm. The plot shows that for a given bending loss value, the bending radius (and thus the bend diameter $D_B$) is increased significantly.

Other index profiles are amenable to the non-bend embodiment of LMA optical fiber 10. For example, the other single-ring embodiment of optical fiber 10 discussed above in connection with FIG. 3 and FIG. 4, the double ring embodiments discussed in connection with FIG. 7 through FIG. 10, and the triple-ring embodiments discussed above in connection with FIG. 11 and FIG. 12 can also be designed so that single-mode operation is obtained with $D_B \to \infty$. In the single-ring embodiment of LMA optical fiber 10, the higher order core modes couple to ring modes. If needed, the ring modes can be stripped out with large bend since they are very bend sensitive. In the double and triple-ring embodiment of LMA optical fiber 10, the rings 32R1, 32R2 and 32R3 can couple to each other such that higher order modes in the core can tunnel out.

Optical System Applications

LMA optical fiber 10 of the present invention can be used in a number of different types of optical systems for a number of different applications.

Figure 19:
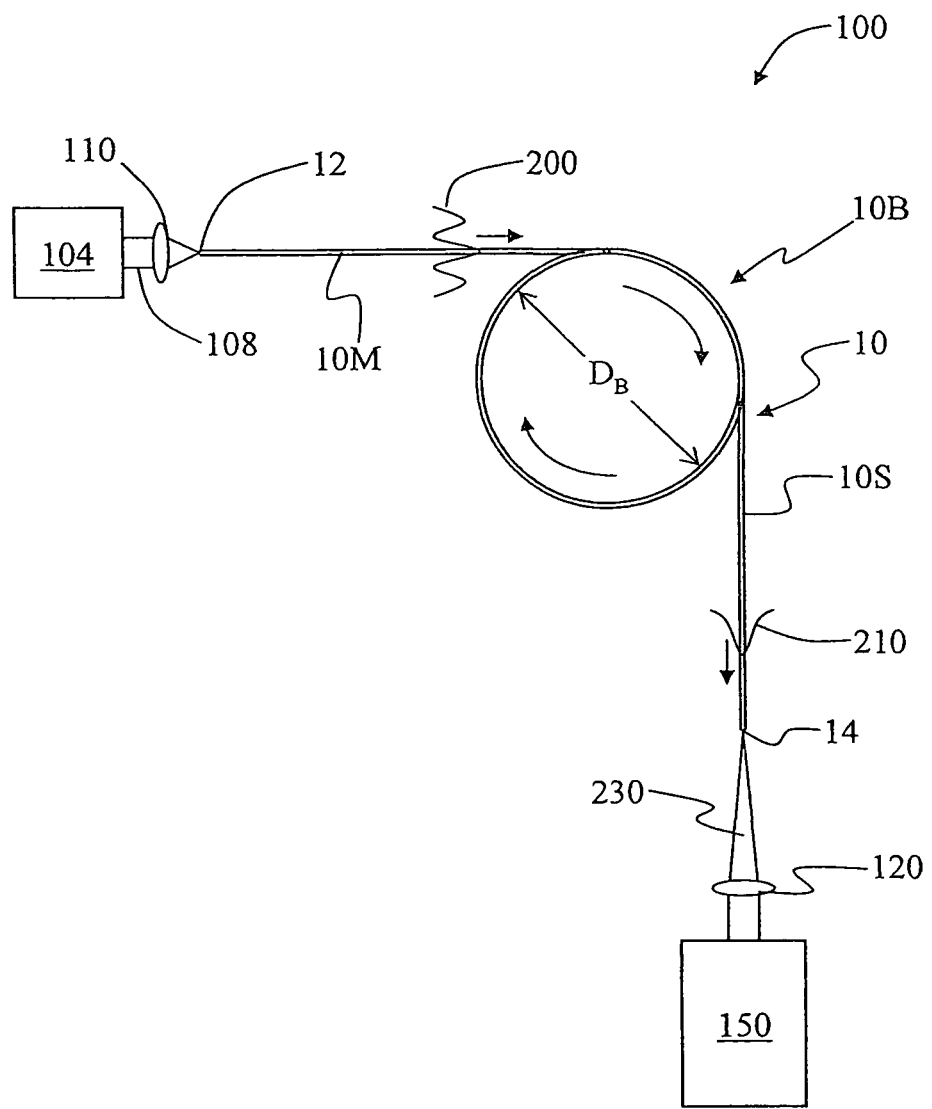
FIG. 19 is a schematic diagram of an example optical system that employs the LMA optical fiber of the present invention to create a single-mode output beam from a multiple-mode guide wave.

FIG. 19 is an example of an optical system 100 that converts multimode guided light into single-mode guided light and provides an output beam based on the single-mode guided light. Optical system 100 includes an input light source 104 that generates input light 108. Input light source 104 is optically coupled to input end 12 of a LMA optical fiber 10 via an input coupling lens 110. In an example embodiment, LMA optical fiber 10 includes a bend 10B having a select bend diameter $D_B$ that, as described above, provides the optical fiber with single-mode operation. In an example embodiment, bend 10B includes one or more full turns of optical fiber 10. In another example embodiment, optical fiber 10 does not include a bend of select bend diameter $D_B$, but may nevertheless include a bend with a very large bend diameter just so that the optical system can be kept relatively compact.

LMA optical fiber 10 can be divided into three sections. The first section is section 10M where the optical fiber supports multiple modes. Section 10M is optically upstream of bend 10B. The second section is aforementioned bend 10B, which is a transition zone where the higher-order modes undergo high attenuation relative to the FM and get stripped away. The third section is section 10S, optically downstream of bend 10B, where only the FM propagates due to the mode filtering effect of bend 10B. Optical system 100 also optionally includes an output coupling lens 120 arranged adjacent optical fiber output end 14.

In the operation of optical system 100, input light source 104 generates input light 108, which is coupled into LMA optical fiber 10 at its input end 12 via input coupling lens 110. This light travels in optical fiber section 10M as multiple-mode guided wave 200 that includes both the FHOM and the FM. Multi-mode guided wave 200 travels to bend 10B, where the higher-order modes are stripped away (with our without the resonant bending effect), leaving only the FM 210 traveling in optical fiber section 105. FM 210 is then output from LMA optical fiber at output end 14 as a diffraction-limited output light beam 230. Output light beam 230 can then be provided to a receiving optical system 150 arranged adjacent output coupling lens 120. Receiving optical system 150 is any optical system that receives and transfers or processes the light in output light beam 230.

Another example application eminently suited for an active embodiment of the LMA optical fiber 10 of the present invention is wavelength conversion. With an Yb or Er-doped core 20, LMA optical fiber 10 can achieve efficient amplification at, for example, the 1 μm wavelength region or the 1.5 μm wavelength region. When an active LMA optical fiber 10 is pumped at high power, it can serve as an amplifier that provides high-power single-frequency output without the onset of detrimental nonlinear effects. The high-power output beam generated from active LMA optical fiber 10 has diffraction-limited beam quality and can itself be used as a pump source for a optical parametric resonator (OPR) to generate different wavelengths, such as visible and mid-IR wavelengths. The high-quality beam generated by active LMA optical fiber 10 can be focused to very small size so that nonlinear conversion efficiency can be greatly improved as compared to conventional OPRs. In an example embodiment, exemplary wavelength-conversion processes that can be performed with LMA optical fiber 10 of the present invention includes second harmonic generation, third harmonic generation, optical parametric resonance, and frequency mixing.

Figure 20:
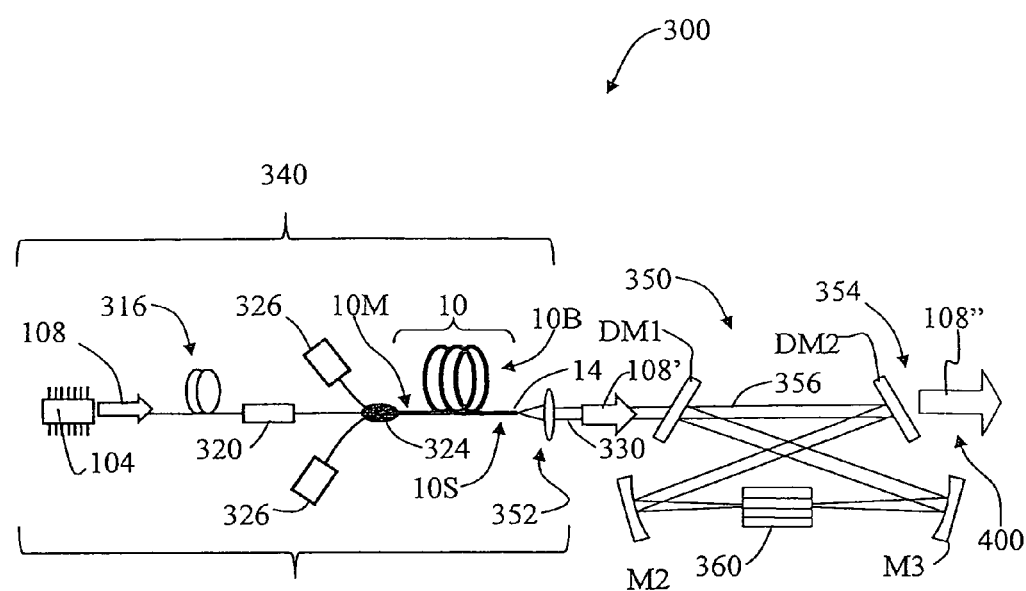
FIG. 20 is an example embodiment of an optical parametric oscillator system (OPRS) according to the present invention that utilizes the LMA optical fiber of the present invention to perform wavelength conversion.

FIG. 20 is an example embodiment of an optical parametric oscillator system (OPRS) 300 according to the present invention that utilizes the LMA optical fiber 10 of the present invention. OPRS 300 includes a light source 104, such as an optical fiber light source operating at a wavelength of 1060 μm. Light source 104 is optically coupled to a pre-amplifier 316, which in an example embodiment is a section of RE-doped optical fiber. Pre-amplifier 316 is in turn optically coupled to an optical isolator 320. A pump combiner 324 is optically coupled to optical isolator 320 as well as to a number of pump light sources 326. Pump combiner 324 is also optically coupled to a section of LMA optical fiber 10 at an input end 12. LMA optical fiber 10 includes multimode section 10M, bend section 10B having one or more loops each with a bend diameter $D_B$, and single-mode section 10S. This portion of OPRS 300 constitutes an optical fiber amplifier 340.

Output end 14 of LMA optical fiber 10 is optically coupled to an optical system 350 having an input end 352, an output end 354 and an associated optical path 356. A non-linear optical medium 360 (e.g., a non-linear optical crystal) is arranged in optical path 356. In an example embodiment, a zig-zag optical path 356 is formed by two dichroic mirrors DM1 and DM2 and two regular mirrors M1 and M2 arranged as shown in FIG. 19, with the dichroic mirrors DM1 and DM2 respectively arranged at the input and output ends 352 and 352.

In the operation of OPRS 300, light source 104 generates input light 108 that travels to pre-amplifier 316, which pre-amplifies the input light. The input light 108 then passes through optical isolator 320, which is designed to prevent light from reaching light source 310. Light 108 then travels through pump combiner 324 and to LMA optical fiber 10. Meanwhile, pump light sources 326 generate pump light 328 that is directed to LMA optical fiber 10 via pump combiner 324. Pump light 328 serves to pump the (rare-earth) doped core 20 so that input light 108 is amplified to form amplified light 108' when it passes through the core. Amplified light 108' then enters optical system 350 at input end 352. Amplified light 330 travels over optical path 356 and through non-linear optical medium 360, which performs a wavelength conversion of the amplified light, thereby forming wavelength-converted light 108". Wavelength-converted light 108" then travels over the remainder of the optical path and exits optical system 350 at output end 354, thereby forming an output beam 400 of wavelength-converted light 108".

OPRS 300 is able to generate a relatively large amount of power in output beam 400 (up to 10× more output power) than a conventional OPRS because LMA optical fiber 10 of the present invention can support relatively high optical power without incurring the aforementioned detrimental non-linear optical effects.

It will be apparent to those skilled in the art that various modifications and variations can be made to the present invention without departing from the spirit and scope of the invention. Thus it is intended that the present invention cover the modifications and variations of this invention provided they come within the scope of the appended claims and their equivalents.

What is claimed is:

1. A large-mode-area (LMA) optical fiber comprising:
   (i) a core region having a relative refractive index $\Delta_C$ wherein $0.02\% < \Delta_C < 0.15\%$ and core radius $r_1$ wherein $10\ \mu m < r_1 < 30\ \mu m$;
   (ii) an inner cladding region having an outer radius $r_{IN}$ wherein $50\ \mu m < r_{IN} < 500\ \mu m$, said inner cladding region including:
      (a) a first annular region immediately adjacent to and surrounding the core region and having an inner radius $r_1$, an outer radius $r_2 = r_1 + \delta r_1$, where $3\ \mu m < \delta r_1 < 15\ \mu m$, and a relative refractive index $\Delta_1 = 0\%$;
      (b) at least a first ring surrounding said first annular region and having a relative refractive index $\Delta_{R1}$ wherein $0.5\Delta_C < \Delta_{R1} < 2\Delta_C$, and $\Delta_{R1} > \Delta_1$, an inner radius $r_2$, an outer radius $r_3$, and a ring width $W_{R1}$, wherein $r_{IN} = r_3 + \Delta r_{O1}$ for $\delta r_{O1} \geq 0$, and wherein $r_{IN} \geq r_3 > r_2 > r_1$;
   (iii) an annular outer section immediately surrounding the ring section and having an inner radius $r_3$, an outer radius $r_{IN} = r_3 + \Delta r_O$, and a relative refractive index $\Delta_3$, wherein $\Delta_3 \geq \Delta_1$; and
   (iv) an outer cladding immediately surrounding the inner cladding and having a relative refractive index $\Delta_O \leq \Delta_1$.

2. The optical fiber according to claim 1, wherein $\delta r_{O1} = 0$ so that the first ring extends to the outer cladding.

3. The optical fiber according to claim 1, wherein the inner cladding includes a second ring surrounding the first ring.

4. The optical fiber according to claim 3, wherein the second ring has an inner radius $r_4 = r_3 + \Delta r_M$ wherein $\delta r_M > 0$, an outer radius $r_5 = r_{IN} - \delta r_{O2}$ wherein $\delta r_{O2} \geq 0$, and a relative refractive index $\Delta_{R2}$ wherein $0.5\Delta_C < \Delta_{R2} < 2\Delta_C$ and $\Delta_{R2} > \Delta_1$.

5. The optical fiber according to claim 4, wherein $\delta r_{O2} = 0$ so that the second ring extends to the outer cladding.

6. The optical fiber according to claim 3, wherein the inner cladding includes a third ring surrounding the second ring.

7. The optical fiber according to claim 1, wherein $0.02\% < \Delta_C < 0.1\%$.

8. The optical fiber according to claim 1, wherein $\delta r_{O1} \geq 2\ \mu m$.

9. The optical fiber according to claim 1, wherein $\delta r_{O1} \geq 5\ \mu m$.

10. The optical fiber according to claim 1, wherein $\Delta_3 > \Delta_1 + 0.01\%$.

11. The optical fiber according to claim 1, wherein $\Delta_3 < \Delta_1 + 0.02\%$.

12. The optical fiber according to claim 1, wherein the core region has an effective area $A_{eff} > 150\ \mu m^2$.

13. The optical fiber according to claim 1, wherein the core region has an effective area $A_{eff} > 300\ \mu m^2$.

14. The optical fiber according to claim 1, wherein the core region has an effective area $A_{eff} > 500\ \mu m^2$.

15. The optical fiber according to claim 1, wherein the optical fiber is provided with a bend having a select bend diameter $D_B$ such that $D_B \geq 9$ cm, wherein said bend causes the optical fiber to support a single mode.

16. The optical fiber according to claim 15, wherein $D_B \geq 15$ cm.

17. The optical fiber according to claim 1, wherein the core region is doped with one or more rare-earth elements so as to make the core region a gain medium.

18. The optical fiber of claim 1, wherein the optical fiber includes stress-inducing regions arranged relative to the core region so as to make the optical fiber polarization maintaining.

19. The optical fiber of claim 18, wherein the stress-inducing regions include either bow-tie stress rods or circular-cross-section stress rods.

20. The optical fiber of claim 1, having a mode field diameter (MFD) of 300 $\mu m^2$ at a wavelength $\lambda = 1060$ nm.

21. An optical system that converts multi-mode light to single-mode light, comprising:
   a light source adapted to generate input light;
   the optical fiber according to claim 1 that includes an output end and an input end, with the input end optically coupled to the light source.

22. The optical system according to claim 21, wherein the core region is doped with at least one rare-earth element so as to form a gain medium, and further including:
   a pump light source optically coupled to the optical fiber and configured to provide pump light to the active core region to pump the gain medium so as to provide optical amplification of the input light passing through the gain medium.

23. The optical system of claim 22, further including:
   a non-linear optical medium arranged to receive optically amplified input light outputted from the output end of the optical fiber and form therefrom wavelength-converted light.

24. An optical system that converts multi-mode light to single-mode light, comprising: a light source adapted to generate input light;
   the optical fiber according to claim 15 that includes an output end and an input end, with the input end optically coupled to the light source.

25. The optical system according to claim 24, wherein the core region is doped with at least one rare-earth element so as to form a gain medium, and further including:

a pump light source optically coupled to the optical fiber and configured to provide pump light to the active core region to pump the gain medium so as to provide optical amplification of the input light passing through the gain medium.

26. The optical system of claim 25, further including:
a non-linear optical medium arranged to receive optically amplified input light outputted from the output end of the optical fiber and form therefrom wavelength-converted light.

27. A method of transforming multimode guided light into a substantially diffraction-limited output light beam based on a fundamental guided mode, comprising:
providing an optical fiber according to claim 1, wherein the optical fiber has an input end and an output end;
introducing light in the input end and guiding the light in the multiple modes in the core region; and
passing the multiple modes through a sufficient length of optical fiber so that only the fundamental mode remains guided by the core region; and
outputting light from the fundamental mode at the output end as the output light beam.

28. The method of claim 27, further including performing wavelength-conversion on the output light beam.

29. The method of claim 28, wherein performing wavelength-conversion includes at least one of: second harmonic generation, third harmonic generation, optical parametric resonance, and frequency mixing.

30. The method of claim 27, further including using the output light beam as a pump light beam to pump a gain medium.

31. The method of claim 27, including:
forming in the optical fiber a bend having a select bend diameter $D_B$ at which the optical fiber substantially attenuates higher-order guided modes as compared to the fundamental mode at a wavelength $\lambda$ so that only the fundamental mode is supported by the optical fiber; and
passing light guided in multiple modes in the core region through said bend.

32. The method of claim 31, further including performing wavelength-conversion on the output light beam.

33. The method of claim 32, wherein performing wavelength-conversion includes at least one of: second harmonic generation, third harmonic generation, optical parametric resonance, and frequency mixing.

34. The method of claim 31, further including using the output light beam as a pump light beam to pump a gain medium.

35. A method of generating laser light from an input light, comprising:
providing a section of optical fiber according to claim 17 having an input end and an output end;
optically pumping the gain medium with pump light; and
passing the input light through the gain medium from said input end so as generate said laser light at said output end.

36. A method of forming a large-area-mode (LMA) optical fiber, comprising:
forming a core region having a relative refractive index $\Delta_C$ wherein $0.02\% < \Delta_C < 0.15\%$ and core radius $r_1$ wherein $10\ \mu m < r_1 < 30\ \mu m$;
forming a cladding around the core region, the cladding having inner and outer cladding regions, wherein the inner cladding region has an outer radius $r_{IN}$ wherein $50\ \mu m < r_{IN} < 500\ \mu m$;
forming in the inner cladding region a first annular region immediately adjacent to and surrounding the core region and having an inner radius $r_1$, an outer radius $r_2 = r_1 + \delta r_1$, where $3\ \mu m < \delta r_1 < 15\ \mu m$, and relative refractive index $\Delta_1 = 0$; and
forming in the inner cladding region immediately surrounding the first annular region at least a first ring surrounding and having a relative refractive index $\Delta_{R1}$ wherein $0.5\Delta_C < \Delta_{R1} < 2\Delta_C$, and $\Delta_{R1} > \Delta_1$, an inner radius $r_2$, an outer radius $r_3$, and a ring width $W_{RP}$, wherein $r_{IN} = r_3 + \Delta r_{O1}$ for $\delta r_{O1} \geq 0$, and wherein $r_{IN} \geq r_3 > r_2 > r_1$.

37. The method according to claim 36, including using a deposition process to form the core region and the cladding, including said at least a first ring.

38. The method according to claim 36, further including:
forming the outer cladding to have a relative refractive index $\Delta_O < \Delta_1 - 0.01\%$.

39. The method according to claim 36, including forming only one ring that extends all the way to the outer cladding.

40. The method according to claim 36, including forming a second ring within the inner cladding region and surround at least the first ring.

41. The method according to claim 40, including:
forming only first and second rings; and
forming the second ring so that it extends all the way to the outer cladding.

42. The method according to claim 40, including forming a third ring within the inner cladding region and surrounding the second ring.

43. The method according to claim 36, including forming a bend in the optical fiber having a bend diameter $D_B$ such that $9\ cm \leq D_B \leq 40\ cm$, wherein said bend causes the optical fiber to support a single fundamental mode.

44. The method according to claim 43, including forming the bend such that $15\ cm \leq D_B \leq 30\ cm$.

45. The method of claim 43, further including:
propagating multiple guided modes in the optical fiber optically upstream of said bend and towards said bend; and
passing the multiple guided modes through said bend so as propagate a single fundamental guided mode in the optical fiber downstream of said bend.

46. The method of claim 36, further including doping the core region so as to make the core region a gain medium.

47. The method of claim 46, further including:
pumping the gain medium; and
passing input light through the gain medium so as to amplify the input light.

48. The method of claim 47, wherein the input light has a wavelength, and further including:
interacting the amplified input light with a non-linear optical medium so as to form output light having an output wavelength different from the input light wavelength.

* * * * *